United States Patent
Mallinson

(10) Patent No.: US 8,994,659 B2
(45) Date of Patent: Mar. 31, 2015

(54) METHODS FOR SHAPE DETECTION CORRELATED WITH POSITION DETECTION AND SYSTEMS FOR PROCESSING THE SAME

(75) Inventor: Dominic S. Mallinson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 384 days.

(21) Appl. No.: 13/237,847

(22) Filed: Sep. 20, 2011

(65) Prior Publication Data

US 2013/0072301 A1    Mar. 21, 2013

(51) Int. Cl.
    *G09G 5/08*     (2006.01)
    *A63F 13/20*     (2014.01)

(52) U.S. Cl.
    CPC ......... *A63F 13/06* (2013.01); *A63F 2300/1012* (2013.01); *A63F 2300/1031* (2013.01); *A63F 2300/1043* (2013.01); *A63F 2300/105* (2013.01); *A63F 2300/1087* (2013.01)
    USPC ........................................................ 345/158

(58) Field of Classification Search
    USPC ................ 345/156–158; 463/36–39
    See application file for complete search history.

(56) References Cited

U.S. PATENT DOCUMENTS

| | | | |
|---|---|---|---|
| 4,988,981 A * | 1/1991 | Zimmerman et al. | 345/158 |
| 5,097,252 A | 3/1992 | Harvill et al. | |
| 6,088,017 A * | 7/2000 | Tremblay et al. | 345/156 |
| 2003/0048312 A1 | 3/2003 | Zimmerman et al. | |
| 2003/0125099 A1* | 7/2003 | Basson et al. | 463/7 |
| 2011/0134043 A1 | 6/2011 | Chen | |

OTHER PUBLICATIONS

PCT International Search Report and Written Opinion of the International Searching Authority (ISA) issued in International Application No. PCT/US2012/055940, European Patent Office, Apr. 8, 2013.

* cited by examiner

*Primary Examiner* — Jimmy H Nguyen
(74) *Attorney, Agent, or Firm* — Martine Penilla Group, LLP

(57) ABSTRACT

A shape object, methods, and systems for using the shaped object in interactive computer gaming is disclosed. The shape object includes a line segment having a length that extends between a first end and a second end, and the line segment is flexible into a plurality of positions, where each of the plurality of positions define a shape of the line segment. The shape object further includes an optical fiber integrated along the line segment and an interface connectable to the line optical fiber of the line segment. The interface is at the first end of the line segment. The interface includes a circuit for communicating optical signals to the optical fiber, where the circuit is configured to identify the shape and changes in the shape of the line segment over time. Further included is a circuit for wirelessly transmitting the shape of the line segment to a computer that is remote from the line segment. The first end of the line segment is configured for placement at a known separation to a tracked object that is separately tracked in three dimensional space.

27 Claims, 23 Drawing Sheets

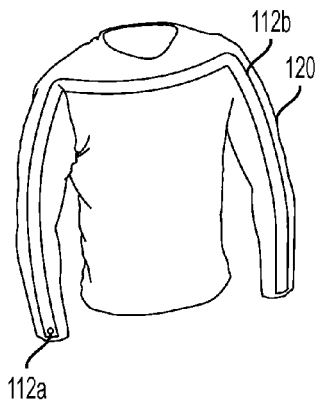
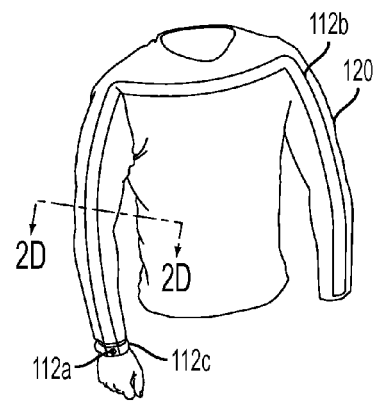
FIG. 2B  FIG. 2C
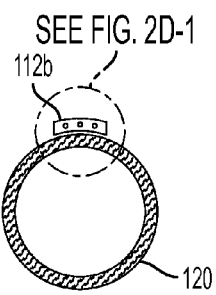
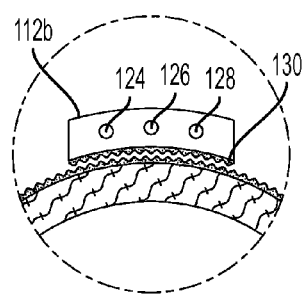
FIG. 2D  FIG. 2D-1
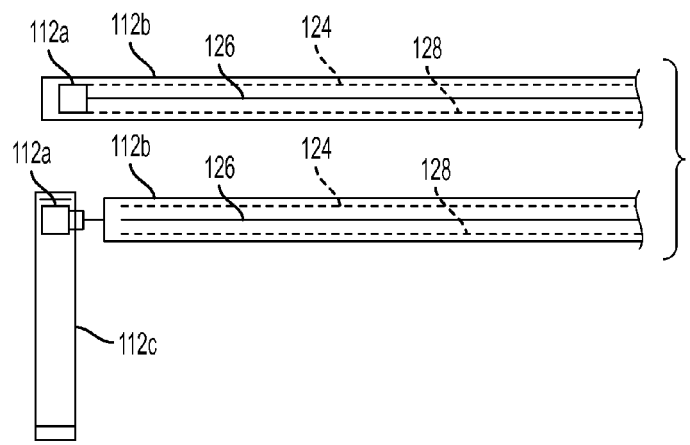
FIG. 2E

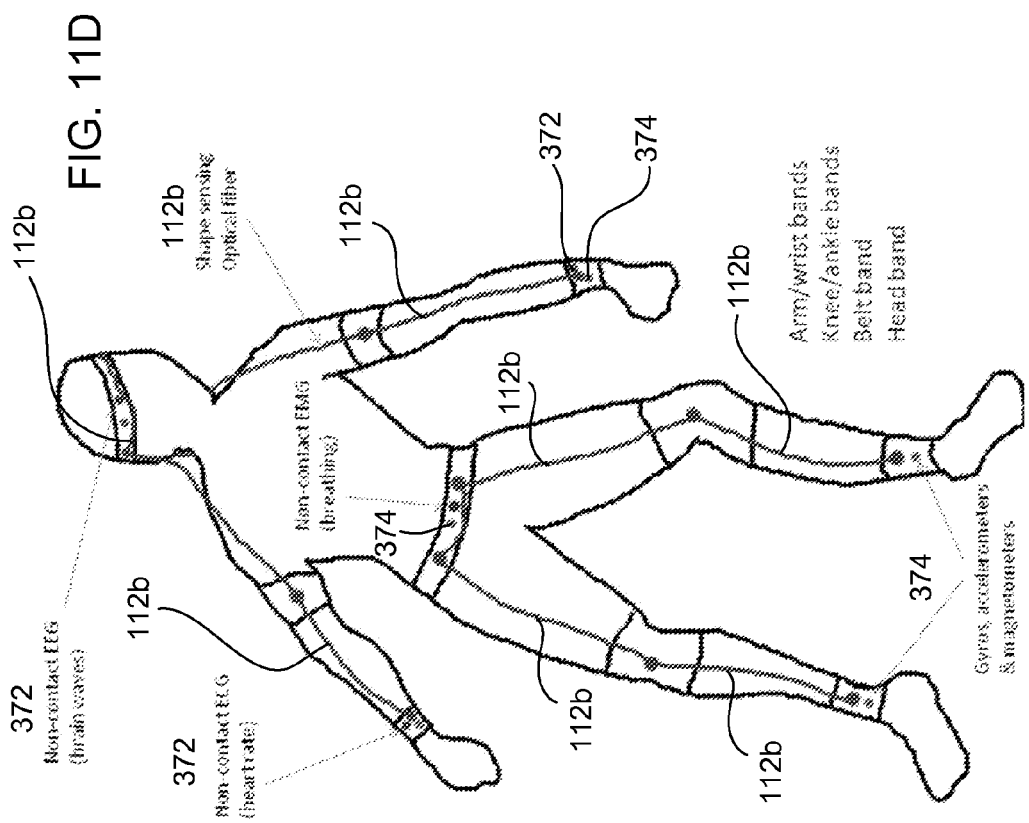
FIG. 11D
FIG. 11E

US 8,994,659 B2

METHODS FOR SHAPE DETECTION CORRELATED WITH POSITION DETECTION AND SYSTEMS FOR PROCESSING THE SAME

BACKGROUND

1. Field of the Invention

The present invention relates to methods and systems for detecting shape of an object and tracking position when interfacing with an interactive program.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements, and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for detecting shape of an object and tracking position when interfacing with an interactive program. It should be appreciated that the present invention can be implemented in numerous ways, such as a process, an apparatus, a system, a device or a method on a computer readable medium. Several inventive embodiments of the present invention are described below.

In one embodiment, a shape object is disclosed. The shape object includes a line segment having a length that extends between a first end and a second end, and the line segment is flexible into a plurality of positions, where each of the plurality of positions define a shape of the line segment. The shape object further includes an optical fiber integrated along the line segment and an interface connectable to the line optical fiber of the line segment. The interface is at the first end of the line segment. The interface includes a circuit for communicating optical signals to the optical fiber, where the circuit is configured to identify the shape and changes in the shape of the line segment over time. Further included is a circuit for wirelessly transmitting the shape of the line segment to a computer that is remote from the line segment. The first end of the line segment is configured for placement at a known separation to a tracked object that is separately tracked in three dimensional space.

A system for interfacing with a game computer program is disclosed. The system includes: (a) a computer having a radio transceiver, the computer being connected to an image capture device for capturing an interactive space in front of the image capture device; (b) a shape object defined by, (i) a line segment having a length that extends between a first end and a second end, the line segment being flexible into a plurality of positions, each of the plurality of positions defining a shape of the line segment; (ii) an optical fiber integrated along the line segment; and (iii) an interface connectable to the line optical fiber of the line segment, the interface being at the first end of the line segment, the interface, the interface including a circuit for communicating optical signals to the optical fiber, the circuit being configured to identify the shape and changes in the shape of the line segment over time, and a circuit for wirelessly transmitting the shape of the line segment to the computer that is remote from the line segment; and (c) a tracked object, the tracked object having a transceiver for communicating data to and from the computer, independent of the shape communicated by the circuit of the interface, and the first end of the line segment is configured for placement at a known separation to the tracked object, the tracked object being tracked in three dimensional space by the computer.

A method for detecting a shape of a shape object worn by user is disclosed. The method includes detecting shape data of a line segment that extends along a length between a first end and a second end. The line segment is flexible into a plurality of positions. The method further includes receiving the shape data of the line segment at a computer wirelessly and identifying a position data of a tracked object. The tracked object is located within a known separation of the first end of the line segment. The method then correlates the position data of the tracked object to the first end of the line segment. Movement of the first end of the line segment is continuously correlated to current position data of the tracked object. The method further includes rendering a graphical representation of the tracked object and the line segment to a display during interactivity with a computer program executed by a processor of the computer.

In one embodiment, the clothing or clothing accessories that measure the shape and motion of the clothing as well as heart rate, breathing and other bio-sensors and send the data wirelessly back to a software application, is provided. In one example, a shape sensing fiber optic cable is attached to clothing, such as a track suit top/pants or to a head band. The optical fiber and bio-sensors could be embedded in the clothing. Alternatively, the optical fiber and bio sensors could attach to the clothing using Velcro or other fasteners. In this way, the electronics can be fully detached from the clothing prior to washing. Instead of custom clothing, the fiber optic cable and bio sensors could be attached to wrist bands, upper arm bands (above the elbow), headbands, knee bands, belt and ankle bands. In each case, the fiber optic cable and bio-sensors would connect to a "transmit unit" which would be attached to one of the pieces of clothing. The transmit unit would take the measurements, perform computation and wirelessly transmit the data back to the computer/console/cell phone, where it can be interpreted by the software application. Additional sensors such as 3-axis gyros, 3-axis accelerometers and 3-axis magnetometers can be attached to augment the sensor package.

In one embodiment, the shape sensing of the optical fiber is relative to a single attach point. So, multiple separate cables have no direct spatial relationship. In the case of the headband, its necessary to have the headband's optical cable directly connect to a fixed attachment point on the jacket or to arm bands. In this way a physical spatial relationship can be established between the position/shape of the headband and the body/jacket. The pants could also be connected to a single transmit unit on the jacket or they could have a separate transmit unit of their own. In the case of separate transmit units, the spatial relationship between the pants and the jackets can be estimated within the limits of the shape of the human body.

This example, setup provides accurate relative body motion tracking. A 3-axis magnetometer can also give an absolute measurement of the direction that the person is facing. The whole system can be combined with camera based tracking (face and visible markers) that would also provide absolute position in the camera's frame of reference. It can be used in conjunction with a PlayStation Move™ to give an additional body angle (hand) and an absolute reference position. A glove can also have non-contact ECG (heart rate) plus gyro/accelerometer/magnetometer plus shape sensing optical fiber which would run across the back of the hand and round each finger to allow motion capture of fingers.

Applications include fitness, dance, sports and other software. Full body capture can be performed accurately using this smart clothing. In addition, heart rate, breathing and brain wave data can be collected.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 2B illustrates an example of shape object integrated with a shirt, in accordance with one embodiment of the present invention.

FIG. 2C illustrates an example where shape interface is connected to a strap, in accordance with one embodiment of the present invention.

FIG. 2D illustrates an example cross-section of shirt where shape object is located, in accordance with one embodiment of the present invention.

FIG. 2D-1 illustrates a magnified view of a portion of FIG. 2D.

FIG. 2E illustrates an example of the shape object interfaced with the shape interface, and showing communication with the fiber-optic cable, in accordance with one embodiment of the present invention.

FIG. 4A-1 and 4A-2 illustrates an example of a user wearing shape object, and holding tracked object, in accordance with one embodiment of the present invention.

FIGS. 4B-1 to 4D-2 illustrate examples of movement of a user wearing the shaped object, in accordance with one embodiment of the present invention.

FIG. 11D illustrates an example of a user equipped with a number of body straps that allow for connection of the various shape objects, inertial sensors, and biosensors, in accordance with one embodiment of the present invention.

FIG. 11-E illustrates a glove with a shape-sensing optical fiber.

DETAILED DESCRIPTION

The following embodiments describe methods and systems for detecting shape of an object and tracking position when interfacing with an interactive program.

It will be obvious, however, to one skilled in the art, that the present invention may be practiced without some or all of these specific details. In other instances, well known process operations have not been described in detail in order not to unnecessarily obscure the present invention.

In one embodiment, the system includes a computer and a display. In various embodiments, the computer may be a general purpose computer, a special purpose computer, a gaming console, or other such device which executes an interactive program that is rendered on the display. Examples of gaming consoles as are known in the art include those manufactured by Sony Computer Entertainment, Inc. and other manufacturers. The display may be a television, a monitor, a projector display, or other such displays and display systems which are capable of receiving and rendering video output from the computer. A user provides input to the interactive program by operating a controller. In a preferred embodiment, the controller communicates wirelessly with the computer, as this provides for greater freedom of movement of the controller than a wired connection. The controller may include any of various features for providing input to the interactive program, such as buttons, a joystick, directional pad, trigger, touchpad, touchscreen, or other types of input mechanisms. One example of a controller is the Sony Dualshock 3 controller manufactured by Sony Computer Entertainment, Inc.

Furthermore, the controller may be a motion controller that enables the user to interface with and provide input to the interactive program by moving the controller. One example of a motion controller is the Playstation Move™ controller, manufactured by Sony Computer Entertainment, Inc. Various technologies may be employed to detect the position and movement of a motion controller. For example, a motion controller may include various types of motion detection hardware, such as accelerometers, gyroscopes, and magnetometers. In some embodiments, a motion controller can include one or more cameras which captures images of a fixed reference object. The position and movement of the motion controller can then be determined through analysis of the images captured by the one or more cameras. In some embodiments, a motion controller may include an illuminated element which is tracked via a camera having a fixed position.

Figure 1:
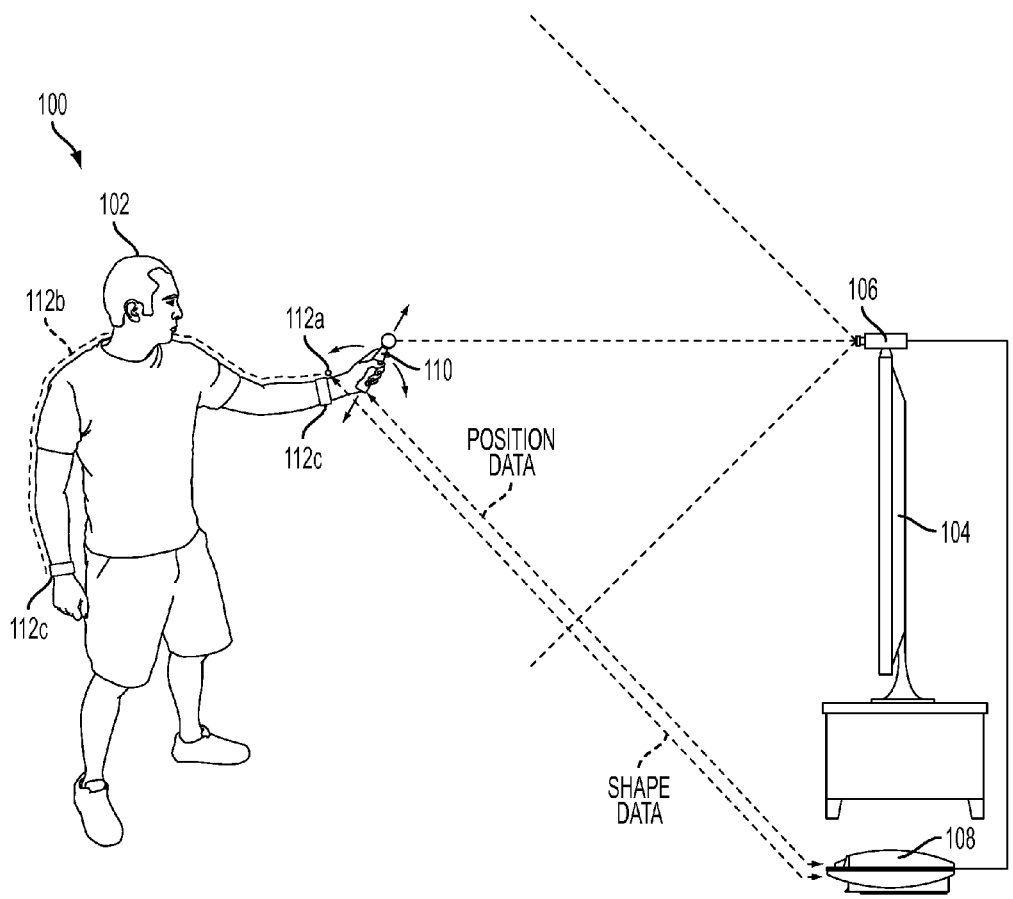
FIG. 1 illustrates a game environment 100, for interfacing with a computer 108, in accordance with one embodiment of the present invention.

FIG. 1 illustrates a game environment 100, for interfacing with a computer 108, in accordance with one embodiment of the present invention. As shown, user 102 is interfacing with the computer 108 that may be executing an interactive program being rendered on display 104. In this embodiment, an image capture device 106 is shown located proximate to the display 104, and directed toward the game environment 100. User 102 is therefore presented in the game environment 100 and captured by the image capture device 106 during interactivity with a program executed at computer 108. In this embodiment, user 102 is shown wearing a shape object 112b and holding a tracked object 110.

Tracked object 110 is a controller device having an identifiable shape that can be tracked by the image capture device 106 and computer 108. Tracked object 110 can be tracked for position in three dimensional space (X, Y, Z), and can also be tracked for inertial motion to identify yaw, tilt, and roll, and general orientation. In this embodiment, the tracking can occur by detecting the tracked object by the image capture device 106, or by transmitting position data from the electronics of the object (e.g., positional and inertial data), forwarded to the computer 108 as position data, or a combination of both. In both cases, tracking will render "position data" that is obtained by the computer 108. For more information regarding method for following tracked object 110, reference may be made to U.S. patent application Ser. No. 13/209,990, filed on Aug. 12, 2011, and U.S. patent application Ser. No. 12/259,181, filed on Oct. 27, 2008, both of which are herein incorporated by reference.

The shaped object 112b is connected to a shape interface 112a. The shape interface 112a is configured to communicate with shaped object 112b, to obtain shape data from the shape object 112b. The shape interface 112a can then independently communicate shape data to computer 108. The shape data is information regarding the present shape of shape object 112b. To identify the relative position of shape object 112b, the shape interface 112a will be located proximate to the tracked object 110. The relative position (Rp) between the shape interface 112a and the tracked object 110 will be known to an approximate degree. The approximate degree will be a known distance between, for example, the wrist of user 102 and the hand of user 102. Although this distance changes slightly from user to user, once the user calibrates the system, the relative position Rp will be known and will be used to identify the specific shapes of shape object 112b, relative to the position in space of tracked object 110. Shaped object 112b, in one embodiment is a shape sensing fiber optic cable. The shape sensing fiber optic cable is defined to detect the shape at various points along the shape object 112b, and report back to a sensing end of shape object 112b, the relative positions of the fiber optic cable along the distance of the shape object 112b. The sensing end of the shape object 112b is shown to be the shape interface 112a. As described in more detail below, the shape interface 112a is configured with independent communication capabilities to transmit the position of shape object 112b to the computer 108, during the interactive session experience by user 102 with a program executed by computer 108.

In one embodiment, the shape object 112b can be defined to include a fiber optic cable, that can be used to sense shape. Although the construction of the shape object 112a/112b can take on various configurations, without limitation, one example configuration is discussed in published U.S. Patent Application No. 2010/0202727 A1, filed on Apr. 21, 2010, which is herein incorporated by reference. Additionally, reference may be made to an article entitled "*NASA-Inspired Shape-Sensing Fibers Enable Minimally Invasive Surgery*," from NASA Tech Briefs, dated Feb. 1, 2008, which is also incorporated herein by reference. It should be understood that the above example constructions are only provided herein to illustrate the theory and engineering data utilized to sense shape, control and communicate light/laser light, and process data.

Furthermore, although detailed description is provided regarding a gaming environment, it is envisioned that the interfacing can also take place during interactive communication with a computer system. The computer system can be a general computer, with a graphical user interface that allows user 102 present and make gestures in space, that control icons, entry, selection, text, and other commands.

As used herein, the term "shape object" shall refer to a line segment that can have any particular length. The length can be performed to a particular shape, such as a glove or the outline of a user's arm, head, legs, etc. The movement of the user can, in one embodiment, cause the line segment to move into various shapes, which can be detected continuously or periodically (depending on the game or situational use). The line segment, in one embodiment, will include an optical fiber that is integrated with the line segment. As noted below, the line optical fiber can be integrated into a clothing item or can be part of an item that can be attached to the person or cloths of the person.

The interface, referred to as the "shape interface' is a circuit or a collection of circuits. The circuits can be configured to interface wirelessly with a computer. The data transmitted by the interface can include shape data, motion data, light data, and biometric sensor data, and combinations thereof. Accordingly, it should be understood that the circuits of the interface can be constructed in various forms, including an application specific integrated circuit (ASIC), a digital signal processor (DSP) operating on local memory, special purpose processors, printed circuit board devices, and power can be provided by a battery. Still further, the circuits can be connected to a vibration device, that can provide the user with tactile feedback during game play. In a specific configuration, a first end of the line segment will define the end that connects or is connected to the interface circuits/logic, and the second end is the distal end.

The known separation is a separation between, for instance, the location of tracked object (e.g., the MOVE device), and the wrist of the user, which will hold the interface circuit that is at the first end of the line segment. The known separation can be, a relative separation, which is between 0-60 cm, or more preferably, between 1-30 cm, and most preferably between about 2-20 cm. In one embodiment, this separation can be identified in a calibration step before commencing game, so as to define a closer estimate of the known separation. For example, if the user is holding the MOVE device in one hand, and the interface circuit is on the user's wrist, it is known that the separation will vary between 3 and 6 cm during game play, as the user's wrist will move the position of the move device. The system can then apply smoothing algorithms to average out the separation to a fix value, which can be used to illustrate the animation on a display, e.g., the movement of the user or an avatar of the user.

Figure 2A:
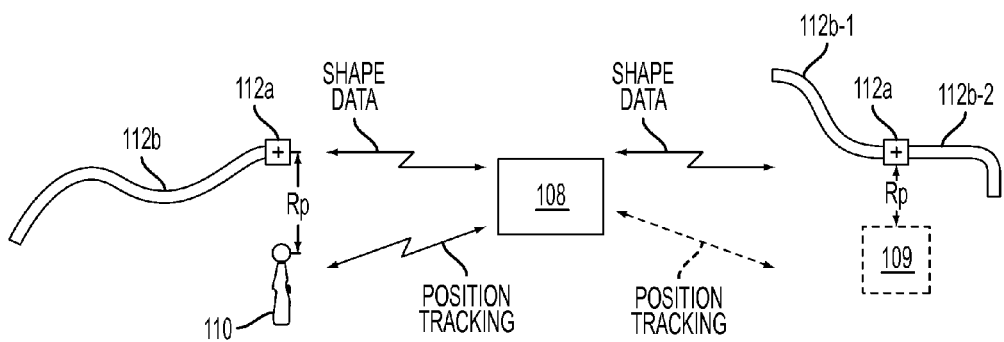
FIG. 2A illustrates a block diagram example of computer communicating with a shape object and shape interface, in accordance with one embodiment of the present invention.

FIG. 2A illustrates a block diagram example of computer 108 communicating with a shape object 112b and shape interface 112a, where a relative position (Rp) to the tracked object 110 is known (e.g., known separation). Also shown is an example where the shape object is defined by shape object segments 112b-1 and 112b-2. A relative position Rp is known between the shape interface 112a and an object 109. Object 109, in this example can be any object that is detectable by a computer system, or a computer system utilizing an image capture device. For example, instead of using a tracked object 110, the system can utilize any other object 109 that can be tracked. An example of an object the can be tracked can include, without limitation, the head of user 102, the torso of user 102, the arms of user 102, the presence of other users in game environment 100, and other similar or related type objects. As will be explained in more detail below, object 109 can be the users head, which will be generally located at a relative position (Rp) to the placement of a shape interface 112a. Thus, it is not necessary to utilize a tracked object 110 to identify the relative position of shape interface 112a, and thus identify the shaped data of shape object 112b in space.

FIG. 2B illustrates an example of shape object 112b integrated with a shirt 120. Shape object 112b can be integrated with the fabric of her shirt 120, or can be attached to shirt 120. For example, the shaped object can be attached to clothing, such as a tracksuit, pants, shirts, headbands, and other wearable or attachable items. As shown, shape interface 112a is located at 1 and a shape object 112b, for communicating with a tracked object 110 (not shown), but configured to be located proximate to and at a relative position to shape interface 112a.

FIG. 2C illustrates an example where shape interface 112a is connected to a strap 112c, that is located at one end of shaped object 112b. Accordingly, shape interface 112a can be located on or integrated with shaped object 112b, or can be separately connected to another object, such as a strap 112c, which is connected to shape object 112b.

FIG. 2D illustrates an example cross-section of shirt 120 where shape object 112b is located. As shown in FIG. 2D-1, the shape object 112b is attached to shirt 120 by an attaching surface 130. The attaching surface 130 can be in the form of various types of attachment mechanisms. Example mechanisms can include Velcro, tape, glue, clamps, straps, clips, stitching, cufflinks, staples, buttons, zippers, connectors, ropes, wrist straps, body straps, hooks, double-sided tape, or a combination thereof. In this embodiment, it is also shown that shape object 112b will include a fiber optic cable 126. Optionally, shape object 112b can include a power connection 124, and data path 128. The data path 128 can be used to detect the shapes at various points along the fiber-optic cable 126, so that data can be obtained from the various points without requiring full transmission in both directions along the fiber-optic cable 126 (from and to the shape interface 112a).

FIG. 2E illustrates an example of the shape object 112b interfaced with the shape interface 112a, and showing communication with the fiber-optic cable 126. The optional data path 128 and the optional power connection 124 is also provided, for illustration purposes. Also shown is a strap 112c, which can hold the shape interface 112a, which is then connected to shape object 112b. As illustrated, the length of shape object 112b can vary depending on the application, and where shaped object 112b is attached, when interfacing with a system.

Figure 2F:
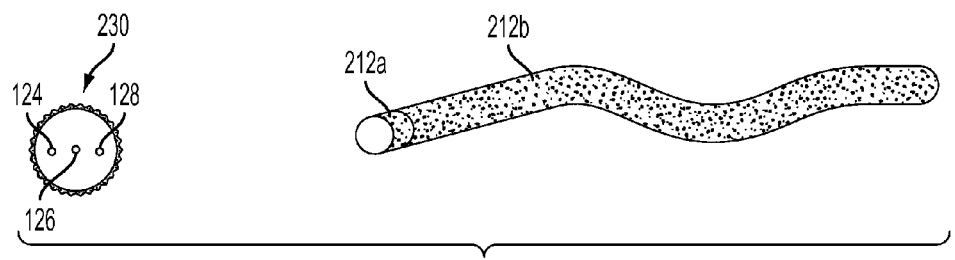
FIG. 2F illustrates an example of shape object, connected to shape interface, when constructed from a different dimensional shape, in accordance with one embodiment of the present invention.

FIG. 2F illustrates an example of shape object 212b, connected to shape interface 212a, when constructed from a different dimensional shape. In this example, the dimensional shape is in the form of a rope, having a generally circular dimension along the length of the segment. Further shown is that shape object 212b can have a surface 230 that has an adhesive or attachment construction, that allows shape object 212b to attach or cling to a user's existing clothing, without the use of straps or connections.

Figure 2G:
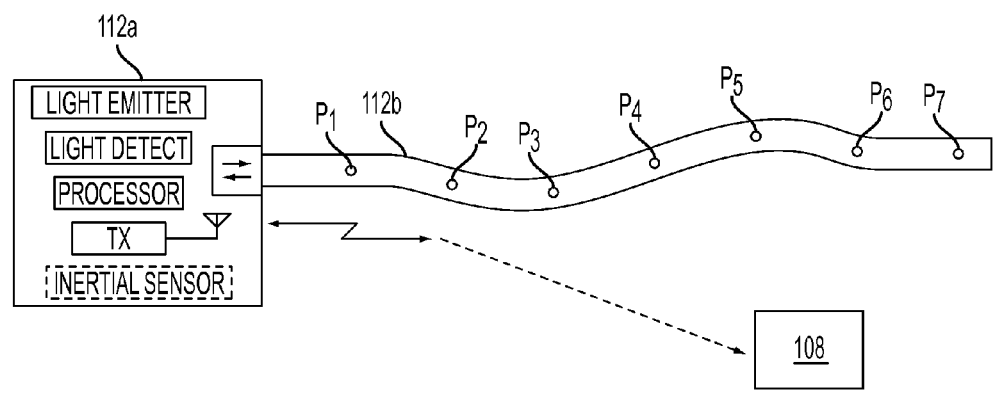
FIG. 2G illustrates an example where shape interface is communicating with the fiber optic cable disposed within shape object, in accordance with one embodiment of the present invention.

FIG. 2G illustrates an example where shape interface 112a is communicating with the fiber optic cable disposed within shape object 112b, in accordance with one embodiment of the present invention. In this example, shape interface 112a will include a light emitter and a light detector. Generically, the light emitter and light detector operate to communicate light to the shape object 112b, and received light reflected back from shape object 112b. The light, in one embodiment, can be in the form of laser light. Other types of light that can be directed to and received from a fiber-optic cable can also work. Shape interface 112a is also shown to include a processor, that can control the transmission of light to and receiving of light from the shape object 112b, along various points (P1-P7) of a length. The processor can be in the form of a circuit that can determine data obtained regarding the current shape of shape object 112b, at various points in time. The processor can also include local memory, to gather information received from the various points along shape object 112b.

The data collected regarding the shape of shape object 112b by the processor is then transmitted by a circuit (Tx), independently back to computer 108. In one embodiment, the circuit is a transmitter in the form of a radio communication device. In specific embodiments, a transceiver can be used. The transceiver can include one of a Wi-Fi™ device, a Bluetooth™ device, an infrared (IR) device, or a radio communication device.

In another optional embodiment, shape interface 112a can also include an inertial sensor that can provide inertial data regarding motion of the shape interface 112a. In one embodiment, shape interface 112a is configured to detect the shape of shape object 112b, along the various points of its length in a continuous manner over time. For instance, the shape can be continuously monitored and transmitted back to computer 108. The continuous monitoring of the shape will allow the computer 108 to determine independently the shape of shape object 112b, without regard to processing or information being obtained from tracked object 110. However, given that the distance between the tracked object 110 (or other object that can be tracked) and the shape interface 112a is known, it is possible to identify a three-dimensional position of the shaped object 112b in space.

It should be understood that other suitable circuitry or methods may be used to identify the shape of shape object 112b, and the various points (P1-P7) can be increased to provide more granularity along the length of shaped object 112b, or reduced in cases of last expected bending, such as a segment positioned along a user's leg. Additionally, the circuitry can be integrated into a digital signal processor, or other suitable electronics and can be battery powered to allow for communication, and pairing, with other devices and with computer 108.

In another embodiment, the line segment that defines the shape object 112b can include a plurality of light emitting devices. The light emitting devices are arranged along the length of the line segment and are configured to illuminate at different intensities based a position along the length or at specific locations along the length, based on the position of the particular light emitting devices along the length. For example, each of points P1-P7 can represent a light emitting diode (LED), which can emit light at the direction of a circuit of the interface 112a. In one embodiment, numerous rows of light emitting diodes can be arranged along the length of the segment 112b. In this manner, based on the position of the line segment 112b and the tracked motions being performed by the user, the line segment can be caused to illuminate in one more configurations, one or more intensities, one or more colors, and one or more shades of colors. Still further, if the line segment is illuminated, it is possible that the illuminated line segment can also be tracked by the camera. In this situation, the computer will be able to receive two separate data channels: one from the transmitted Tx shape data, and one from the detected light segments. Of course, a third data channel would be the channel that detects the tracked object 110 position data, as noted above.

Figure 3A:
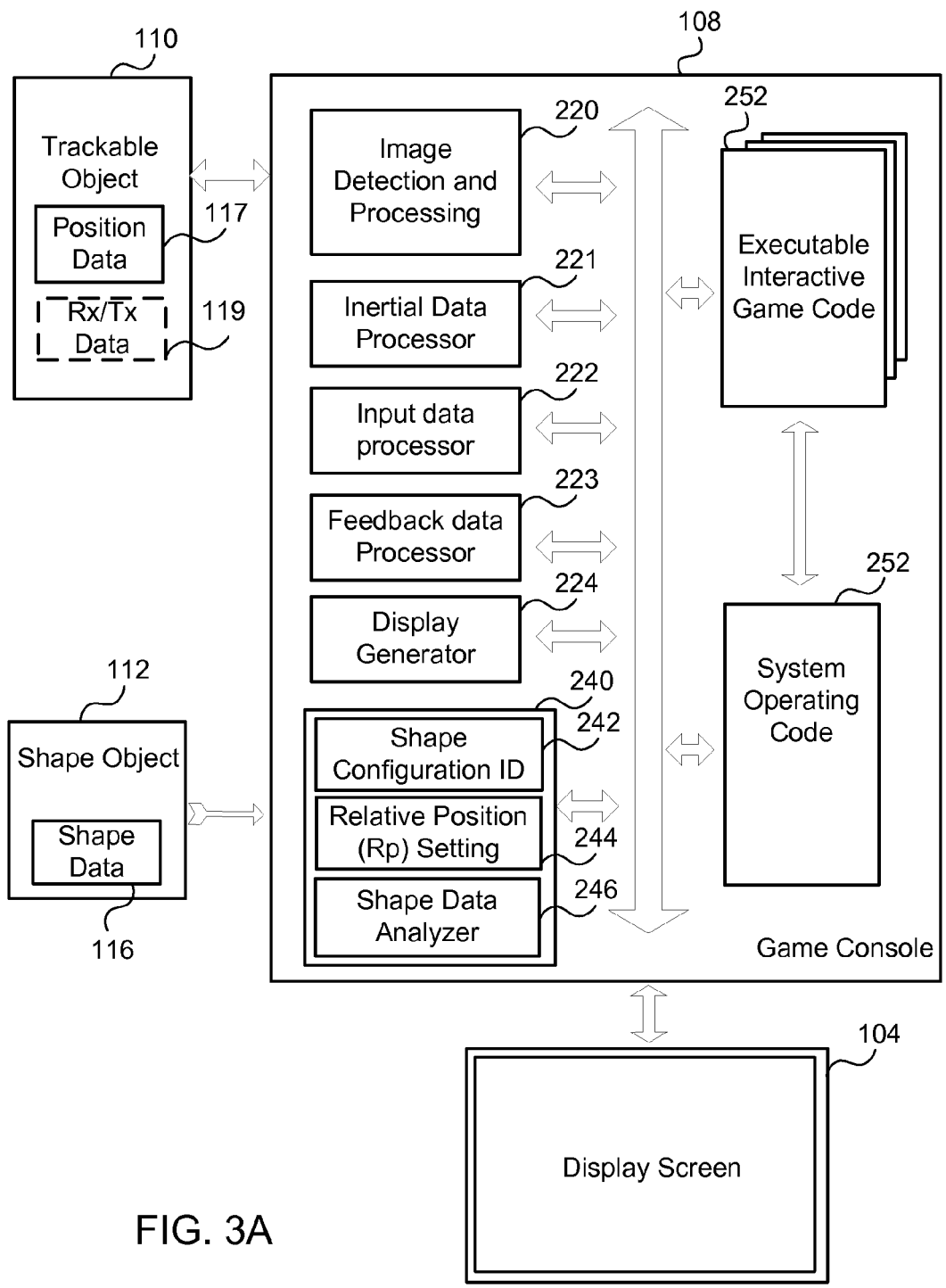
FIG. 3A illustrates a block diagram of a game console, generically, a computer system, that enables communication with a trackable object and a shaped object that produces shape data, in accordance with one embodiment of the present invention.

FIG. 3A illustrates a block diagram of a game console, generically, a computer system, that enables communication with a trackable object 110 and a shaped object 112 that produces shape data 116. Trackable object 110 will produce position data 117 and data that is communicated and received by Rx/Tx circuitry 119. As shown, trackable object 110 is in communication with computer 108 as well as the shaped object 112, by way of shape interface 112a, that provides shape data 116 to computer 108. As illustrated, the communication of shape data 116 to computer 108 is independent of the data obtained of trackable object 110. In general, different communication channels are used to enable this communication to be independent. More specifically, the communication between trackable object 110 is two-way communication, while the shape object communication is one-way communication that can continuously or periodically transmit shape data 116 to computer 108.

In this example, computer 108 will include various computing systems and subsystems, including processors, memory, communication ports, and other circuitry. In one example, computer 108 will include image detection and processing logic 220, inertial data processing logic 221, input data processing logic 222, feedback data processing logic 223, display generator logic 224, and shape processing logic 240. The shape processing logic 240 will include shape configuration ID information to 42, relative position (Rp) 224, and shape data analyzer logic 246. The shape processing logic 240 can be defined in the form of circuitry, or software. The shape processing logic 240 utilizes the shape configuration ID 242 to receive information regarding the segments or segment size, shape, configuration, model number, version number, and other identifier data regarding shaped object 112b that is to be utilized during interfacing with the computer system. The relative positions setting 224 can be provided by user entry, or can be detected during calibration. In another embodiment, the relative positions setting 224 can be detected based on use. In one embodiment, the relative positions setting 224 is a distance between the tracked object, and the shape interface 112a. The shape data analyzer 246 is a process that runs to identify continually the movement of the shape object 112b, and that information is paired and processed against the position data obtained from the trackable object 110. This identification will therefore allow the executable interactive game code 252 to process the position data from the trackable object 110 and the shape data 116 from the shaped object 112, and render real-time position data of a user that may be wearing (or holding) the shaped object 112 on the users body or clothes. Further shown is the computer 108 being interfaced with a display screen 104, which renders the interactive images provided by computer 108. The display screen 104 can be used to render images of the user, and movements of the users body part(s) based on the detected movements of shaped object 112b, during interactivity. In another embodiment, the user himself will be shown on the display screen 104, providing real-time movements. In yet another embodiment, an avatar of the user, or controlled by the user will be rendered making moves similar to those being made by the user wearing the shaped object 112b. The avatar of the user or avatar controlled by the user can therefore interact in the interactive space, and interact with graphics and shapes provided by the computer system. In another embodiment, the avatar of the user, or the user, can interact with other users that may be utilizing the same shaped object 112b, and feedback can be provided to the user by way of sensors that trigger based on interactivity between various users in the interactive space, which may be wearing the shaped objects 112b.

Figure 3B:
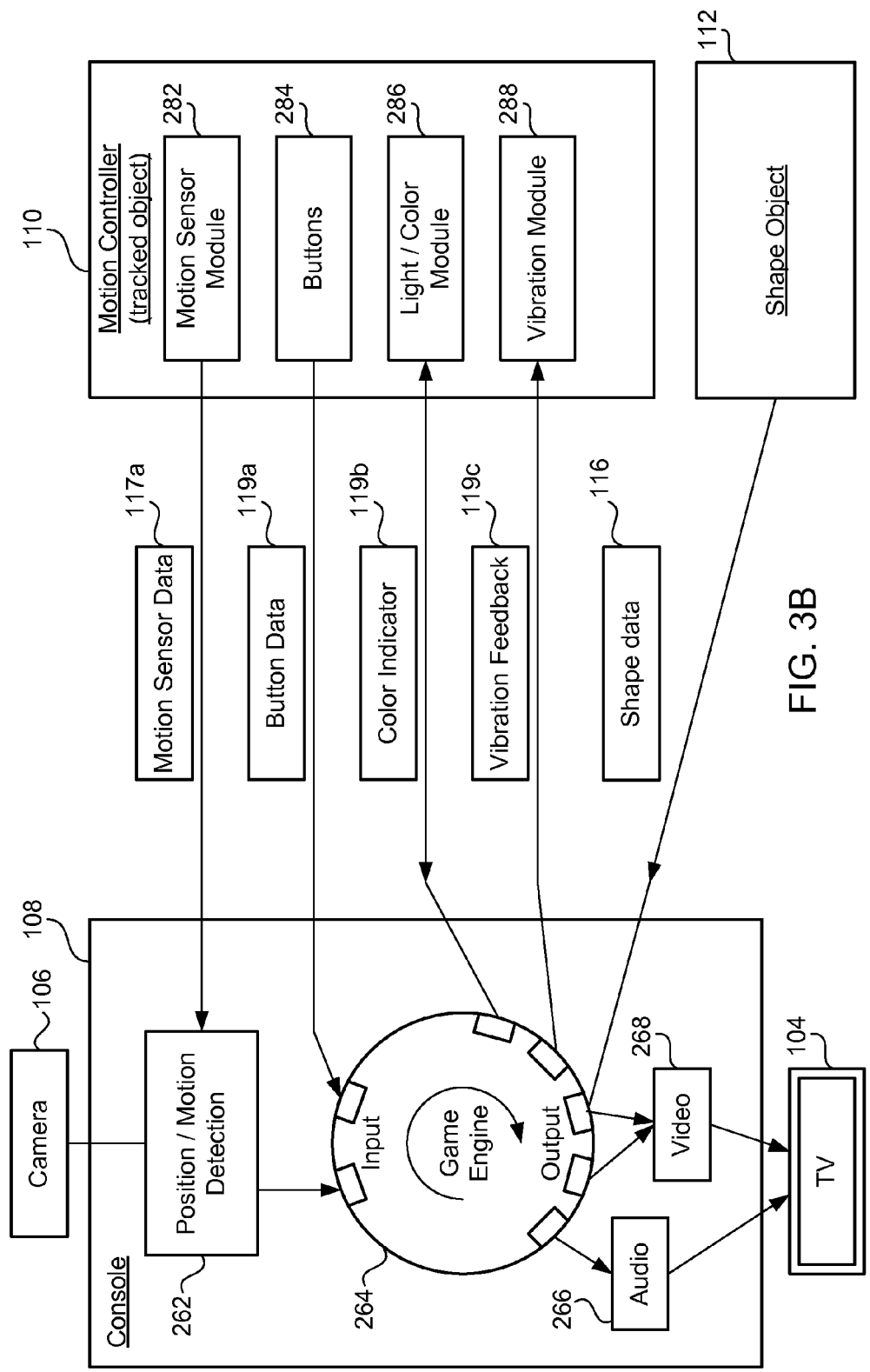
FIG. 3B illustrates another embodiment where computer is configured to process position and motion detection from trackable object, in accordance with one embodiment of the present invention.

FIG. 3B illustrates another embodiment where computer 108 is configured to process position and motion detection from trackable object 110. Motion sensing data 117a is communicated to the position/motion detection 262, as well as button data 119a, which is received from buttons 284 of the trackable object 110. Light and color module 286 can also produce or receive color indicators 119b, and vibration feedback 119c from vibration module 288, all of which communicate with the game engine 246 of computer 108, that is executing at least one interactive program or general program. The game engine can therefore provide output, which can include audio 266 and video 268 that is provided to a display 104. The game engine is also shown receiving shape data from the shape object 112, independently from data exchanged with trackable object 110.

Figure 3C:
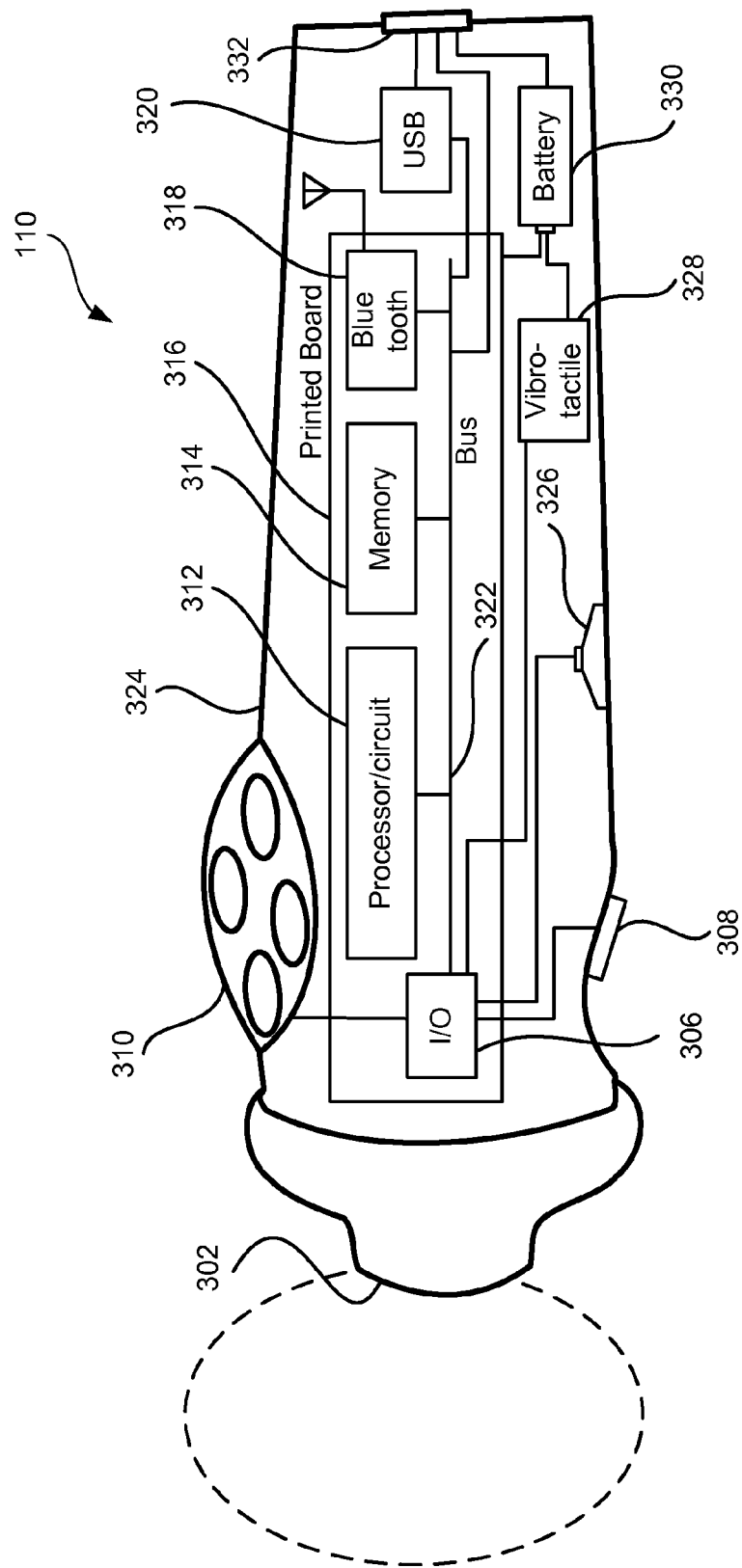
FIG. 3C illustrates the components of one embodiment for a single-hand controller, which is also a trackable object, with expansion connector, in accordance with one embodiment of the present invention.

FIG. 3C illustrates the components of one embodiment for a single-hand controller, which is also a trackable object 110, with expansion connector 302. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 324 is configured to be held by a user operating controller with a single hand. A user's second hand may, of course, be used to hold or select buttons on handle 324. A user holding the controller can provide input by pressing buttons, such as top button 310 and bottom button 308. In one embodiment input can also be provided by moving the controller within a three-dimensional space when a visually recognizable attachment is coupled to handle 324. The controller is configured to operate wirelessly, which facilitates freedom of controller movement in order to interact with the base station device. Wireless communication can be achieved in multiple ways, such as via Bluetooth® wireless link, WiFi, infrared (not shown) link, etc.

Attachments providing expanded capabilities to handle 302 are connected and disconnected to expansion connector 302. In one embodiment, a spherical object or imperfect sphere enables the base computing device to locate the combination of handle and attachment within a three-dimensional space via visual recognition of images taken by a camera attached to the base device. Other embodiments provide additional communication capabilities to controller, such as an attachment that provides ultrasonic communication with the base computing device or with other controllers in the field of play. In yet another embodiment, an attachment provides infrared capabilities to allow the controller to communicate via infrared frequencies with the base station, or to use a controller as a remote control for a TV or other electronic equipment.

In one embodiment, the attachment communicates directly with the base station and can act upon commands received from the base station, such as turning on an internal light or emitting a sound. In another embodiment, the attachment is directly controlled by handle 324 and the attachment only reacts to commands from handle 324. In yet another embodiment, the attachment can react to commands received from the base station or from the handle.

Inside handle 324, printed circuit board 316 holds processor 312, Input/Output (I/O) module 306, memory 316, and Bluetooth module 318, all interconnected by bus 322. A Universal Serial Bus (USB) module 320 also provides interactivity with the base computing device, or with other devices connected to USB port 332. The USB port can also be used to charge the rechargeable battery 430. Vibrotactile feedback is provided by vibrotactile module 328. Speaker 326 provides audio output.

Note that the above controller configuration is exemplary and many modifications thereto, including eliminating or adding modules, would occur to a person of ordinary skill in the art with access to the present Specification, and is well within the scope of the claimed invention. For example, controller 400 can also include sensors for mechanical tracking of the controller movement.

Figures 1, 4A:
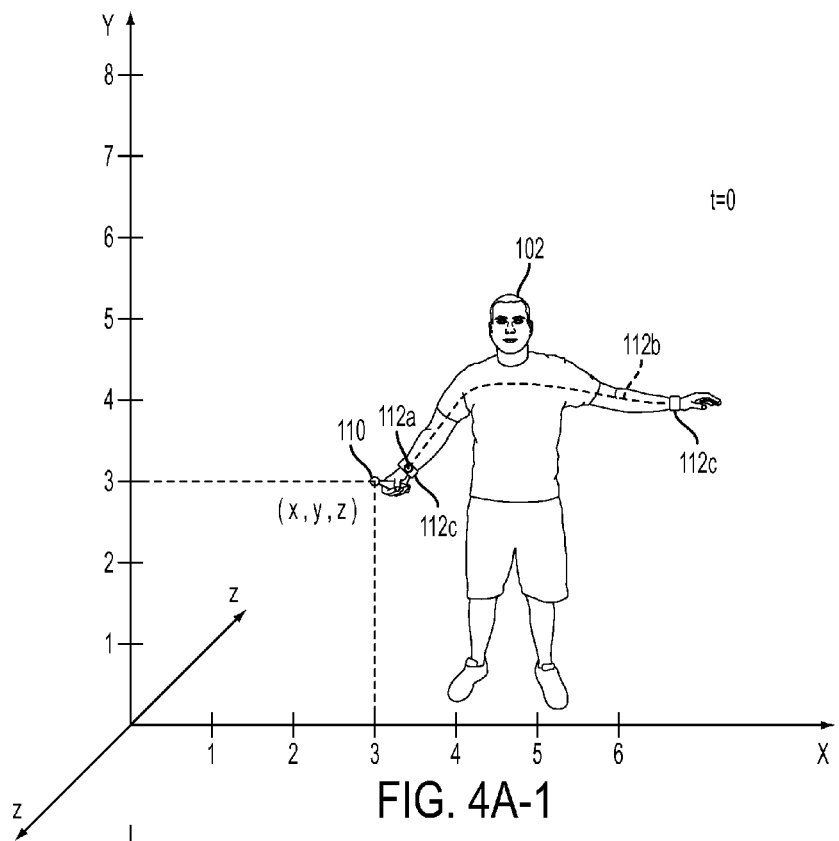
Figures 2, 4A:
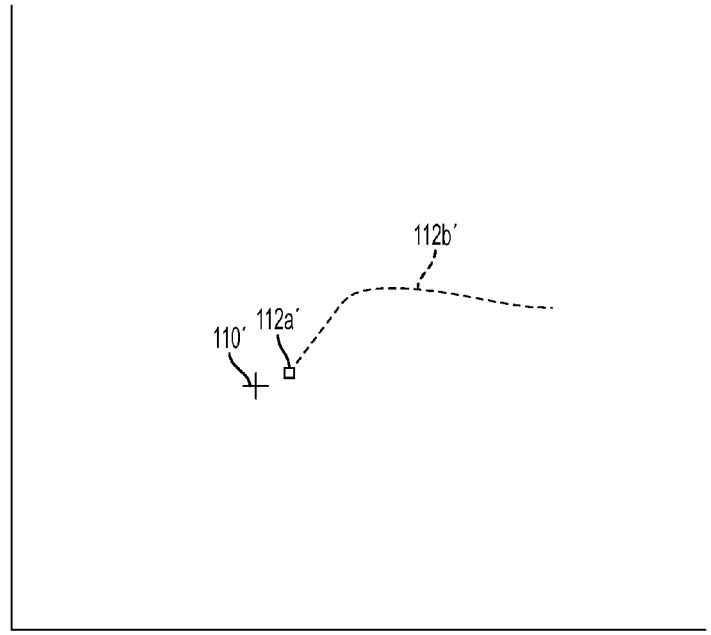
Figures 1, 4B:
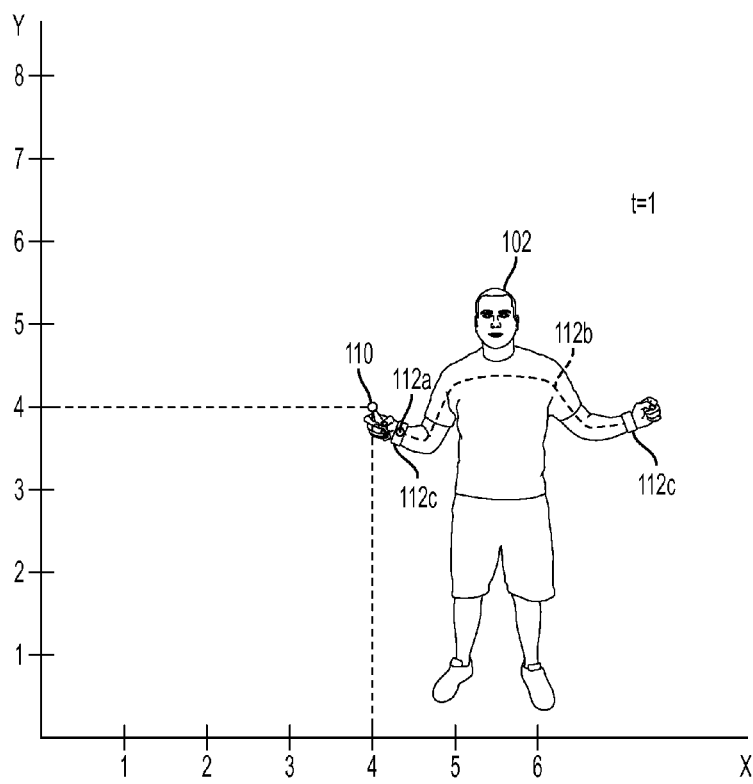
Figures 2, 4B:
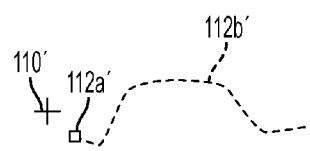
Figures 1, 4C:
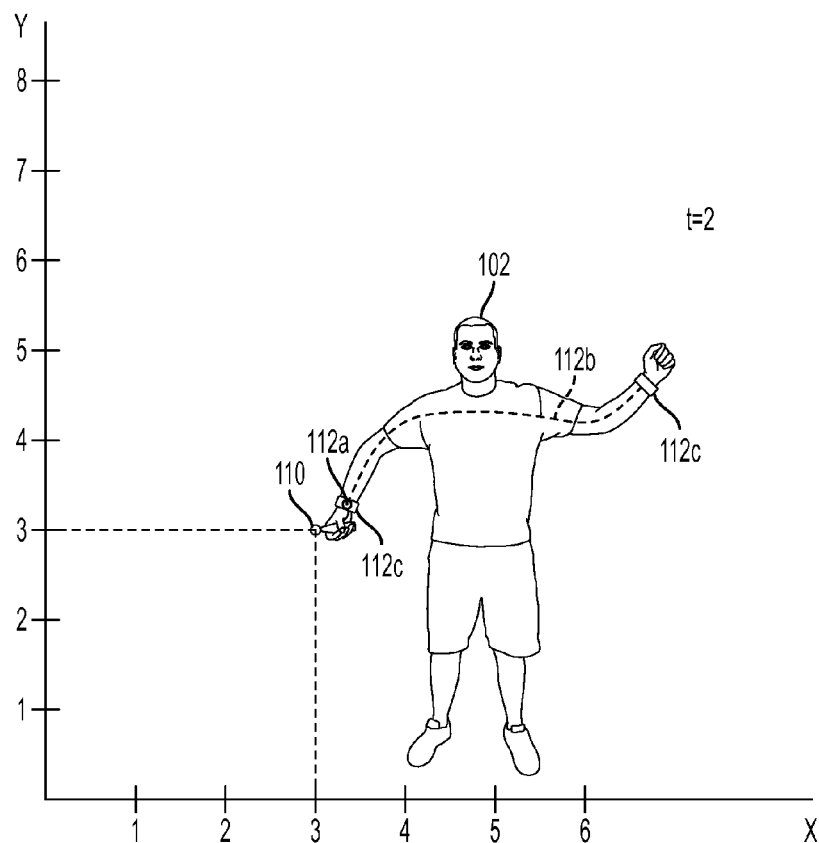
Figures 2, 4C:
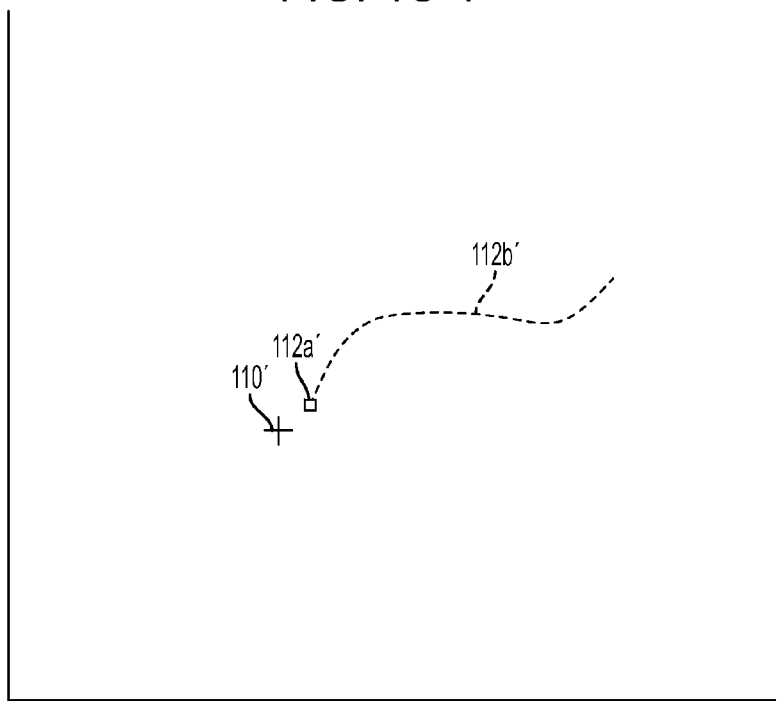
Figures 1, 4D:
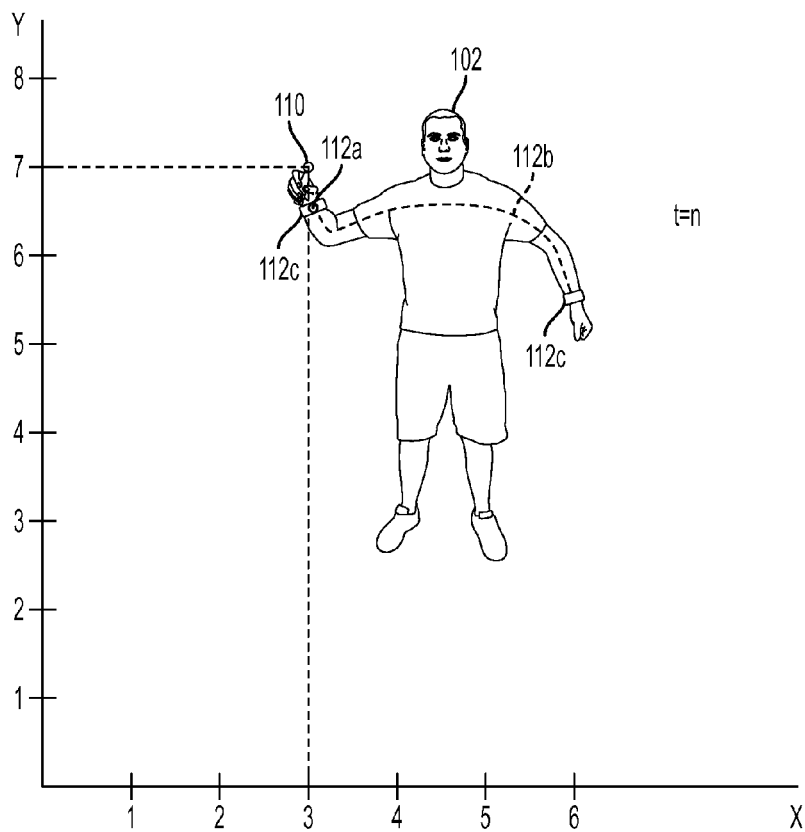
Figures 2, 4D:
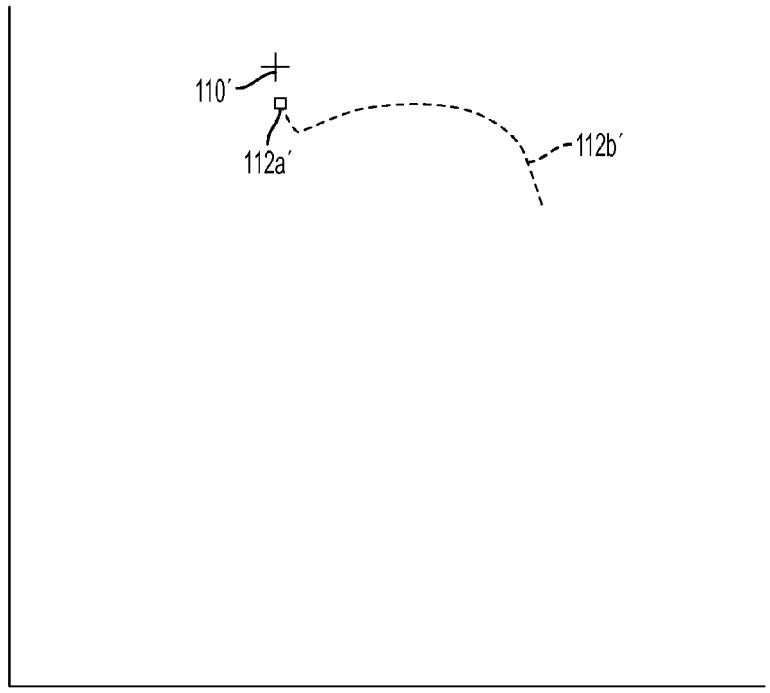

FIG. 4A-1 and 4A-2 illustrates an example of a user 102 wearing shape object 112b, and holding tracked object 110. Tracked object 110 is shown placed at a relative point (Rp) to shape interface 112a. Because the position of tracked object 110 can be precisely monitored to identify X, Y, Z coordinates, it is possible to identify the position, to an approximate known separation (Rp), of shaped object 112a, which defines one and of tracked object 112b. FIG. 4A-2 illustrates the detected tracked object 110', the detected shape interface 112a, and the detected shape object 112b'. This representation shows that the exact location in space of tracked object 112b can be detected by the computing system, during movement of a user 102 and interactivity with a computer program and display. FIGS. 4B-1 to 4D-2 illustrates further examples of movement by user 102 and the precise tracking of shaped object 112b over time.

Figure 5A:
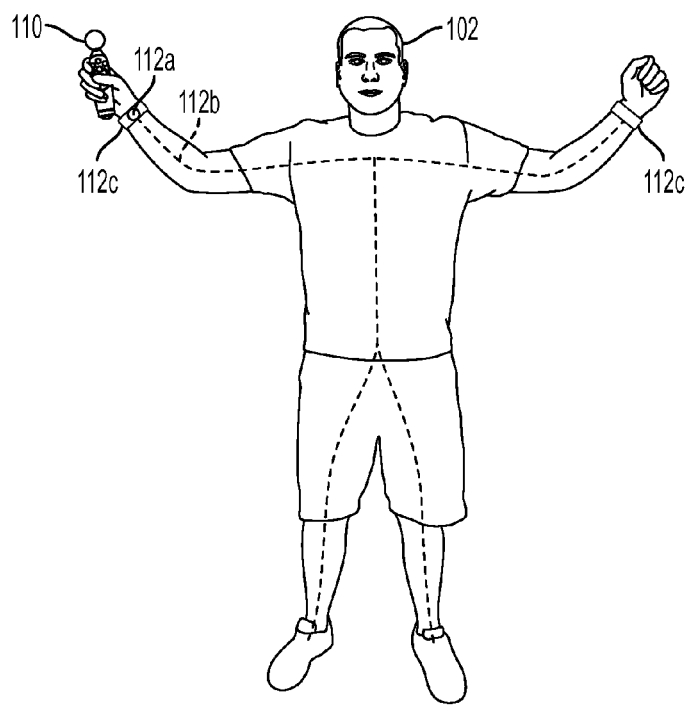
FIGS. 5A-5B illustrates examples where shape object is broken down into a plurality of segments, in accordance with one embodiment of the present invention.
Figure 5B:
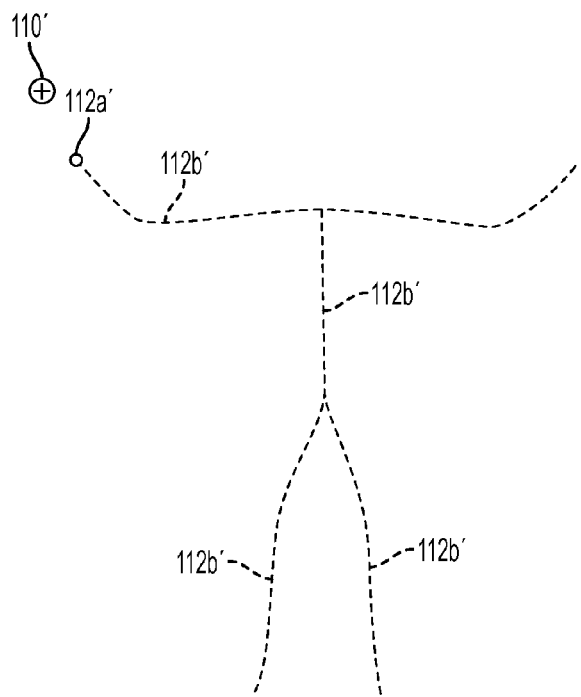

FIG. 5A illustrates an example where shape object 112b is broken down into a plurality of segments. The plurality of segments, having a known length and construction, can be tracked similar to a single segment. In one embodiment, the multiple segments can be defined from one or more fiber-optic lines. In this example, the detected tracked object 110' is shown proximate to the shape interface 112a', in FIG. 5B. The remaining segments can now be tracked, relative to their construction and positioning. As such, the shape objects 112b can be extended to contour any shape, any part of a body, or an object that is not part of the body.

Figure 6A:
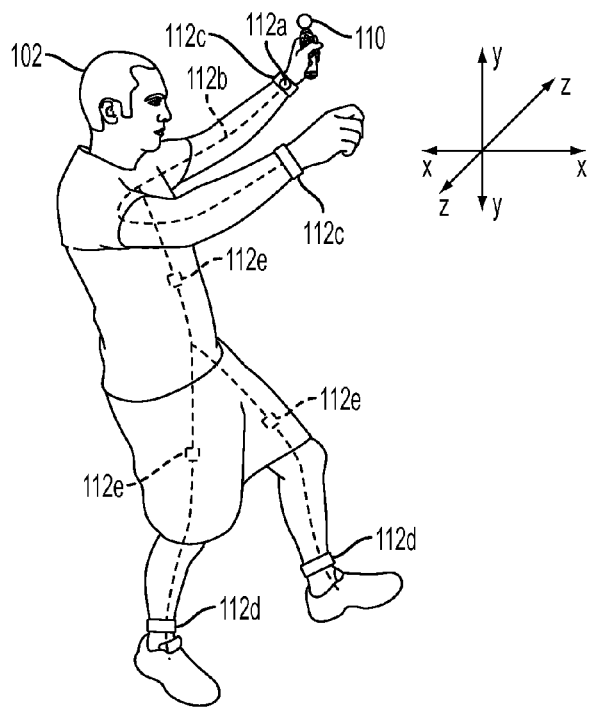
FIGS. 6A-6B illustrate an example of user moving, and the capture of three-dimensional space data, in accordance with one embodiment of the present invention.
Figure 6B:
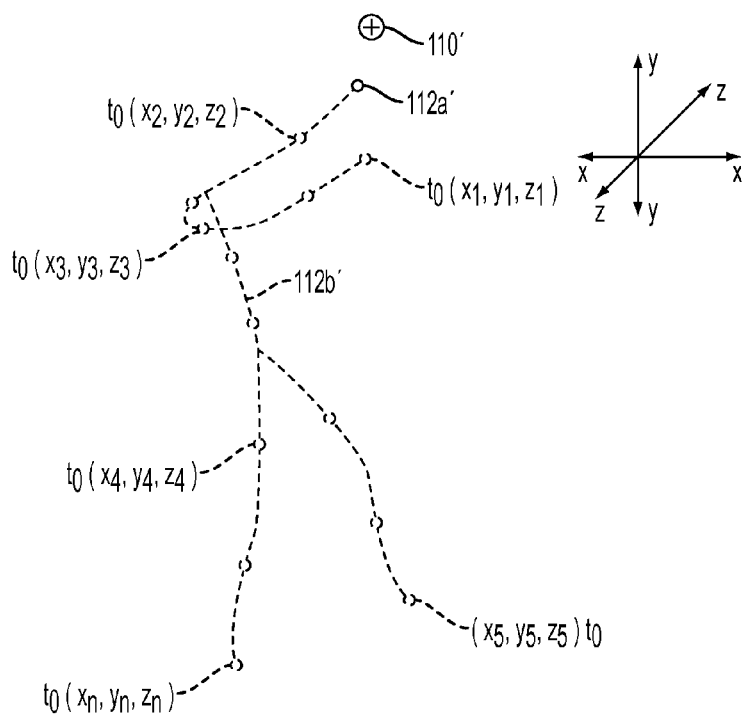

FIG. 6A illustrates an example of user 102 moving in 3 dimensional space. By tracking the position of tracked object 110 in 3 dimensional space, its position can be associated to the position of shape interface 112a, and the segments of shaped object 112b. In this example, the user is shown to have a plurality of attachment straps 112e, which hold the shaped object 112b to the users body or clothes. Also shown are optional straps 112c, which can be worn by a user in his or her wrists, ankles, or around clothing. FIG. 6B illustrates that a three-dimensional position at time t0, can be determined for various points along shaped object 112b, relative to the tract object 110'. More or less points can be tracked, depending on the number of sensor, or sensing points along tracked object 112b, which will provide more or less information regarding the position of the shaped object 112b in XYZ space, which includes depth data.

Figure 7A:
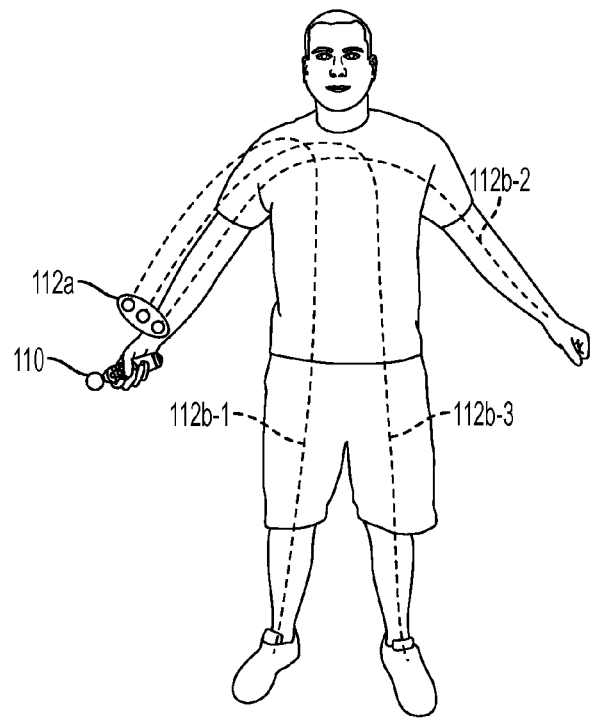
FIGS. 7A-7B illustrates an example where shaped objects are used to communicate with shape interface, in accordance with one embodiment of the present invention.
Figure 7B:
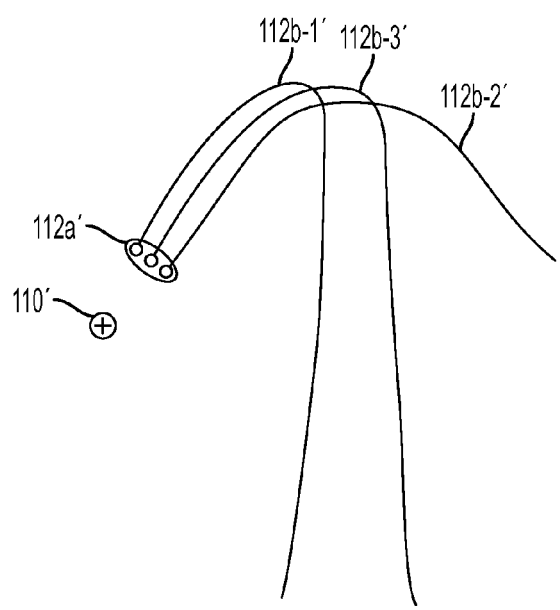

FIG. 7A illustrates an example where shaped objects 112b-1,2,3 are used to communicate with shape interface 112a. In this example, shape interface 112a is shown in a known proximate location relative to tracked object 110. In this embodiment, the track positions of shaped objects can be independently tracked as shown in FIG. 7B.

Figure 8A:
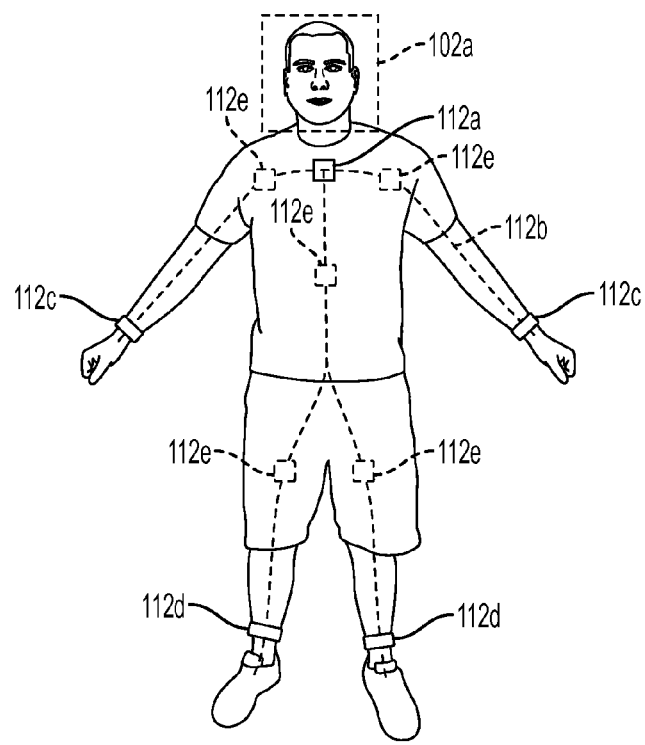
FIG. 8A illustrates an example where the tracted object is no longer being held by user, in accordance with one embodiment of the present invention.

FIG. 8A illustrates an example where the tracked object is no longer being held by user 102. Instead, the tracked object is now a head tracked object 102a. Thus, the users head can be tracked relative to a known position of shape interface 112a. Shape interface 112a is placed proximate to the head 102a of user 102. Because the head of user 102 can be tracked with precision with an image capture device, and head tracking software, the users head becomes a precise and known trackable object. In this manner, the shape object 112b, and its various segments emanating from shape interface 112a, can be tracked with precision, during movement of user 102. In this example, the shaped object 112b is held on user using attachment strips 112e, and straps 112c. The attachment strips 112*e* and straps 112*c*, can take any number of forms and can be constructed by various attachment means, as noted above.

Figure 8B:
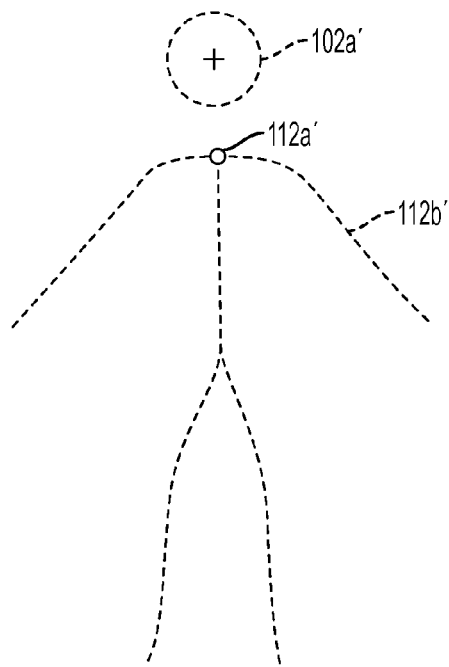
FIG. 8B illustrates the tracked image by the computer system, in accordance with one embodiment of the present invention.

FIG. 8B illustrates the track image by the computer system 108. In this embodiment, the tracked head 102*a'* and the tracked shaped object 112*b'* are independently tracked by computer system 108. That is, the head is tracked by the image sensing device, while the shape of shaped object 112*b* is tracked by receiving shape information (shape data) from shape interface 112*a*. The relative positioning of shape interface 112*a* to the tracked object (in this case the users head), which is known, allows for the identification and positioning in space of the shaped object 112*b*, as it moves over time.

Figure 8C:
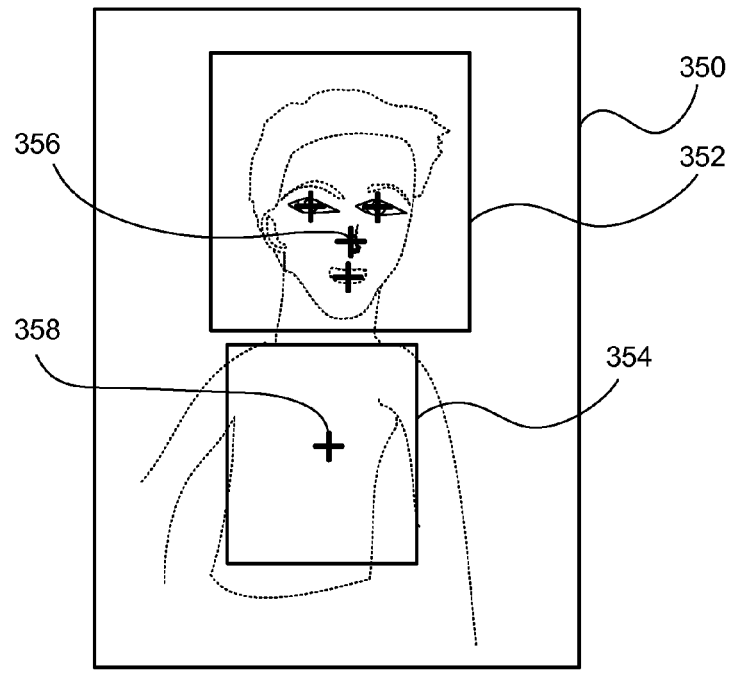
FIG. 8C illustrates an example of a captured image, that locates head location and/or torso location, in accordance with one embodiment of the present invention.

FIG. 8C illustrates an example of a captured image 350, that locates head location 352 and/or torso location 354. A torso centroid 358 can be located, as well as a head centroid 356. Other features of the user space can also be identified, in accordance with one embodiment of the present invention. Other features can include identification of a user's nose, mouth, eyes, and relative positions between the various features of the users face.

Figure 8D:
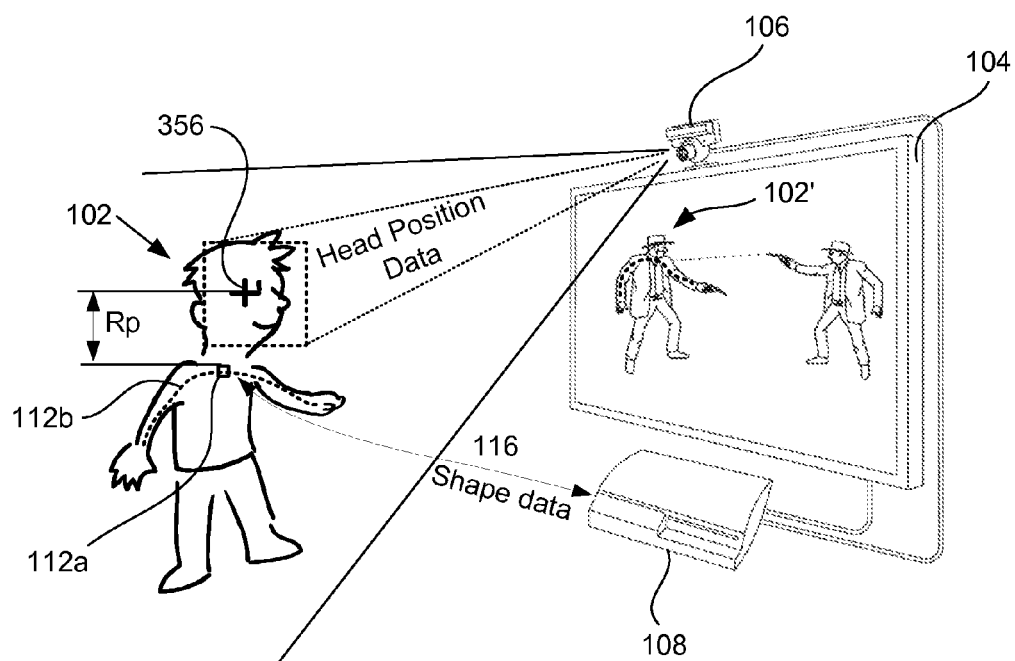
FIG. 8D shows a user being tracked by the image capture device, in accordance with one embodiment of the present invention.

As shown in FIG. 8D, the user 102 can be tracked by the image capture device 1062 identified the head position data and the relative position of the shape interface 112*a*. Shape data 116 is therefore independently communicated to computer 108 while the image capture device 106 communicates image capture data to the computer 108, which will then identify the head position data in three-dimensional space. The head position data can also be identified for depth, for example by identifying the separation between identifiable features on the users face, such as eyes, nose, nose and mouth, etc. Other depth sensing capabilities can be integrated with image capture device 108, such as a separate depth sensing camera that independently monitors depth of the user 102, and objects in the vision area in front of the gaming environment.

Figure 9A:
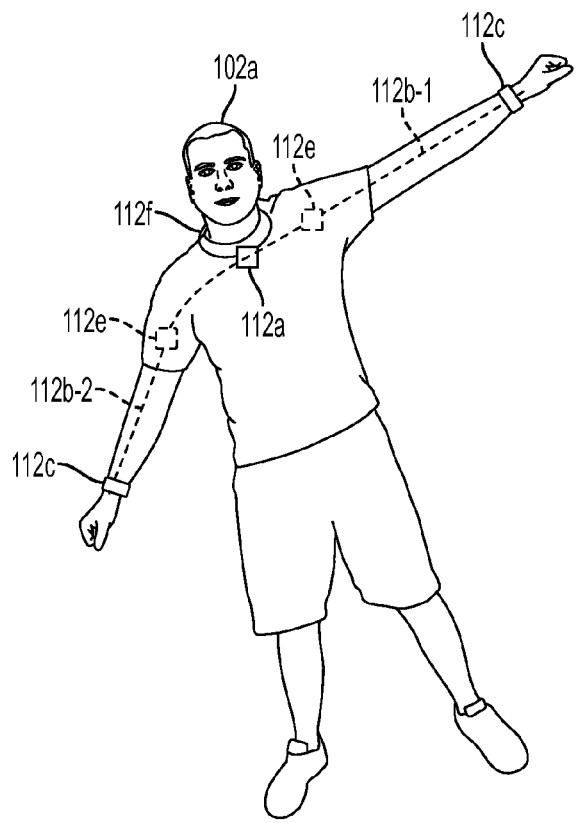
FIGS. 9A-9B illustrate an example where the shape interface is connected to a necklace of user, where the necklace will ensure that the shape interface will be located a known distance to the users head, in accordance with one embodiment of the present invention.
Figure 9B:
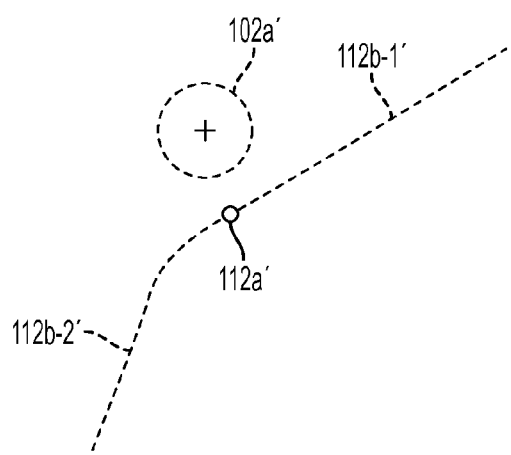

FIG. 9A illustrates an example where the shape interface 112*a* is connected to a necklace 112*f* of user, where the necklace will ensure that the shape interface 112*a* will be located a known distance to the users head 102*a*. FIG. 9B illustrates the independent tracking of the users head and the shaped object, where the distance between the users head and the shape interface 112*a* is known, and controlled by the necklace 112*f*. Again, it is envisioned that the known distance will vary from user to user, but will generally be set to a specific user upon calibration, or within a known +/− tolerance if no calibration is utilized.

Figure 10A:
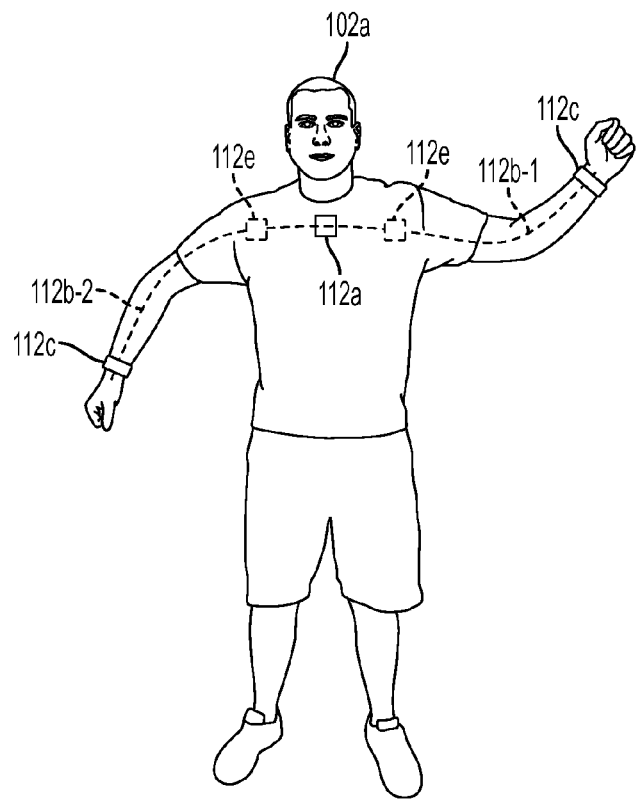
FIGS. 10A and 10B illustrate additional movement of various shape objects segments, as held by attachment strips, in accordance with one embodiment of the present invention.
Figure 10B:
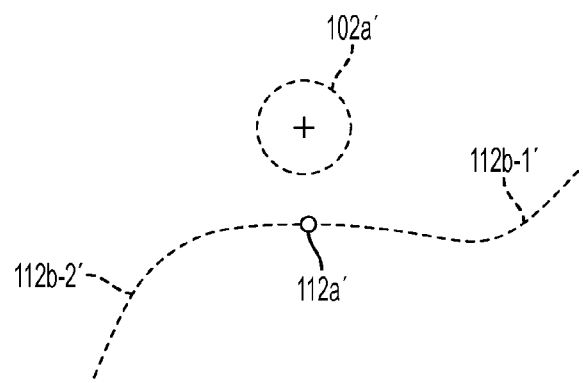

FIGS. 10A and 10B illustrate additional movement of various shape objects segments 112*b*-1 and 112*b*-2, as held by attachment strips 112*e*, while the users head 102*a* is tracked relative to the position of shaped object 112*a*.

Figure 11A:
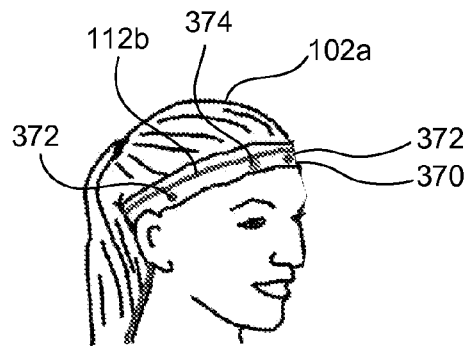
FIG. 11A-11C illustrate examples of the shape object integrated, or attached to various parts of the user's body or clothes, in accordance with one embodiment of the present invention.
Figure 11B:
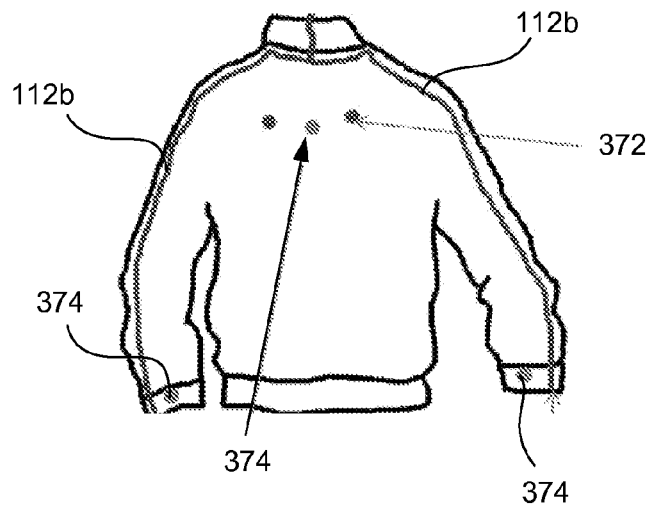
Figure 11C:
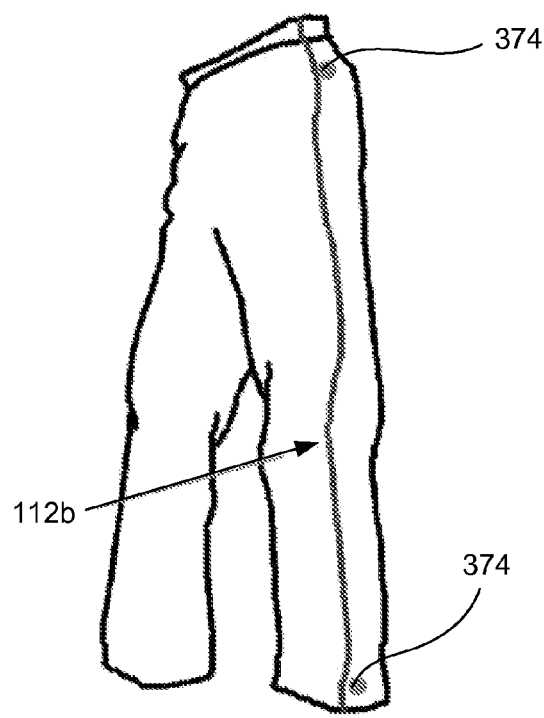

FIG. 11A-11C illustrate examples of the shape object 112*b* integrated, or attached to various parts of the user's body or clothes, in accordance with one embodiment of the present invention. In addition to the shaped object 112*b*, additional sensors can be provided on the clothes of the user 102, such as biosensors 372 and inertial sensors 374. In one embodiment, the biosensors are noncontact EEG to detect brain activity, heart rate measurement ECG sensors, and muscle sensors EMG. In one embodiment, the sensors are configured such that the biosensors do not require skin contact with the user 102. For additional information on sensors that do not require skin contact, reference can be made to an article entitled "*Heart monitor sets the pace for new inventions*," by the University of Sussex's Physiology, dated Apr. 25, 2007, which is herein incorporated by reference. This citation is being provided to illustrate that contact-less sensors are able to obtain biometric data, and their application to a shaped object 112 (line segment), is an embodiment of the present invention.

The inertial sensors can be placed at various locations of the users clothes, and can be configured to communicate with the computer either independently, or through the shape interface 112*a*, that is configured to communicate with the shape object 112*b*. Accordingly, shape interface 112*a* can include additional circuitry for providing input and output from the various biosensors 372 and inertial sensors 374 for communication of that data back to computer 108, during interactivity. In one embodiment, the line segment 112*b* can include one or more biometric sensors. The biometric sensors can be defined to obtain a condition of the user at one or more locations along the line segment. The biometric sensors can produce sensor data that is communicated to the computer by a circuit of the interface 112*a*. In one embodiment, the biometric sensors do not require contact with the user's skin.

FIG. 11D illustrates an example of a user 102 equipped with a number of body straps that allow for connection of the various shape objects 112*b*, inertial sensors 374, and biosensors 372. Communication from the sensors 374 and 372 can be by way of a separate communication unit that interfaces with computer 108, or can be integrated with the shape interface 112*a* (not shown in FIG. 11D, but present on user to allow interfacing with shape object 112*b*). FIG. 11E shows another example of shaped object 112*b* outlining the shape of a user's hand, and various sensors to identify biometric data and/or inertial data (e.g., one or more of gyros, accelerometers, and/or magnetometers).

Figure 12:
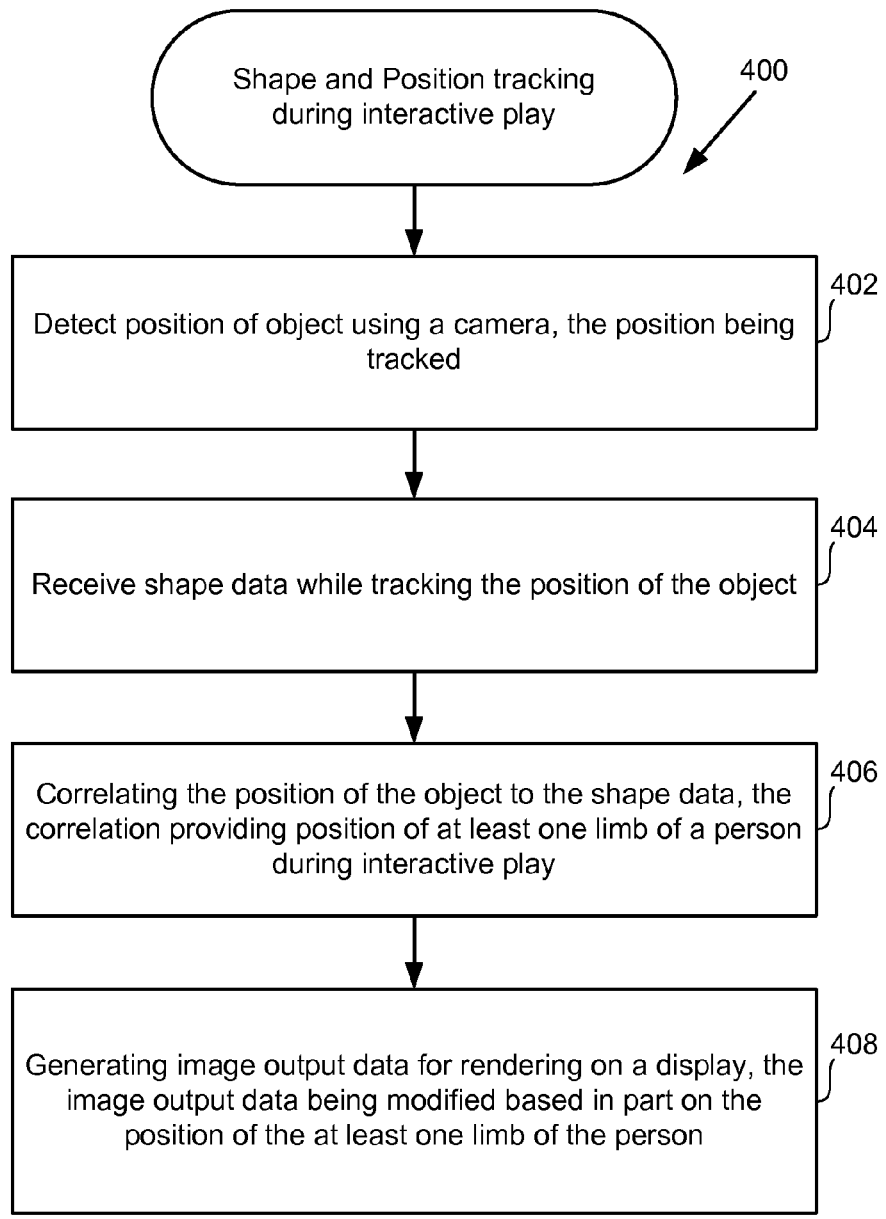
FIG. 12 illustrates an example process flow to identify shape and position tracking during interactive play, in accordance with one embodiment of the present invention.

FIG. 12 illustrates an example process flow to identify shape and position tracking during interactive play, in accordance with one embodiment of the present invention. In this embodiment, operation 402 detect the position of an object using the camera, and the position is tracked. The position can also be augmented with inertial data which can be mixed and geared with the position data detected by the camera. In operation 404, shape data is received while tracking the position of the object. As discussed above, the shape data is independently received by the shape interface 112*a*, that provides the shape of the shape object 112*b* continuously as the shape object 112*b* moves in space. In operation 406, the method will correlate the position of the tracked object to the shaped data, and the correlation will provide the position of at least one limb of the person during interactive play. In operation 408, the image output data is generated for rendering on a display. The image output data is modified based in part on the position of the at least one limb of the person. Accordingly, as the person moves, and the shape of the shape object 112*b* moves, the changes in movement will change the shape of shape object 112*b*, and that shape data is communicated to computer 108 continuously. In real time, the image of the user wearing the shape object 112*b* can be displayed on a screen, during interactive gameplay, or during interactivity with a computer program. In one embodiment, the image of the user is shown on a display in the form of an avatar that moves in a mirroring manner, consistent with the movements of the user.

Figure 13:
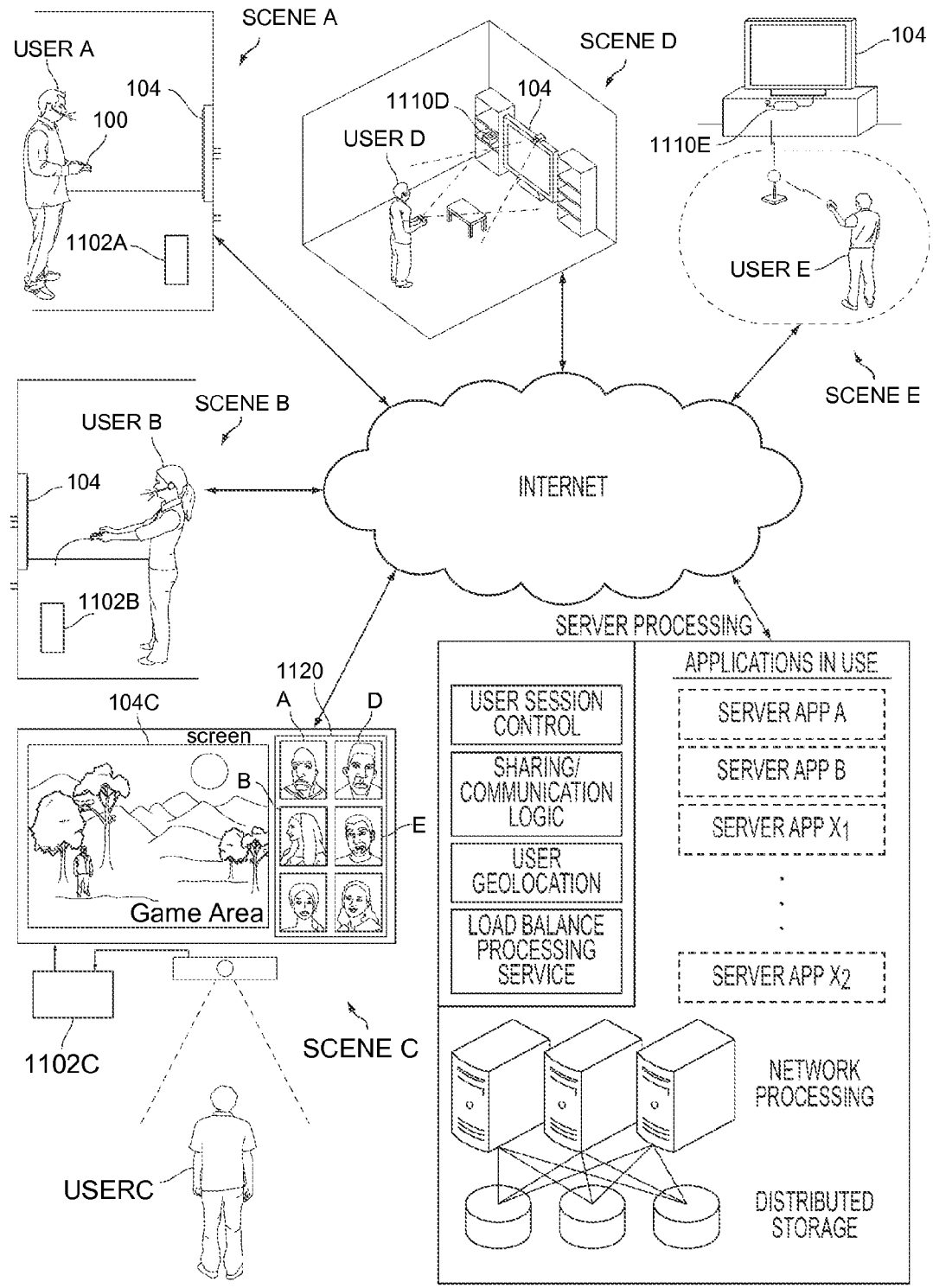
FIG. 13 is an exemplary illustration of scene A through scene E with respective user A through user E interacting with game clients that are connected to server processing via the internet, in accordance with one embodiment of the present invention.

FIG. 13 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a stand-alone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 13, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While a single server processing module is shown, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples of items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment, two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E, respectively. Each game console 1110D and 1110E are connected to the server processing module and illustrate a network where the server processing modules coordinates game play for both game consoles and game clients.

Figure 14:
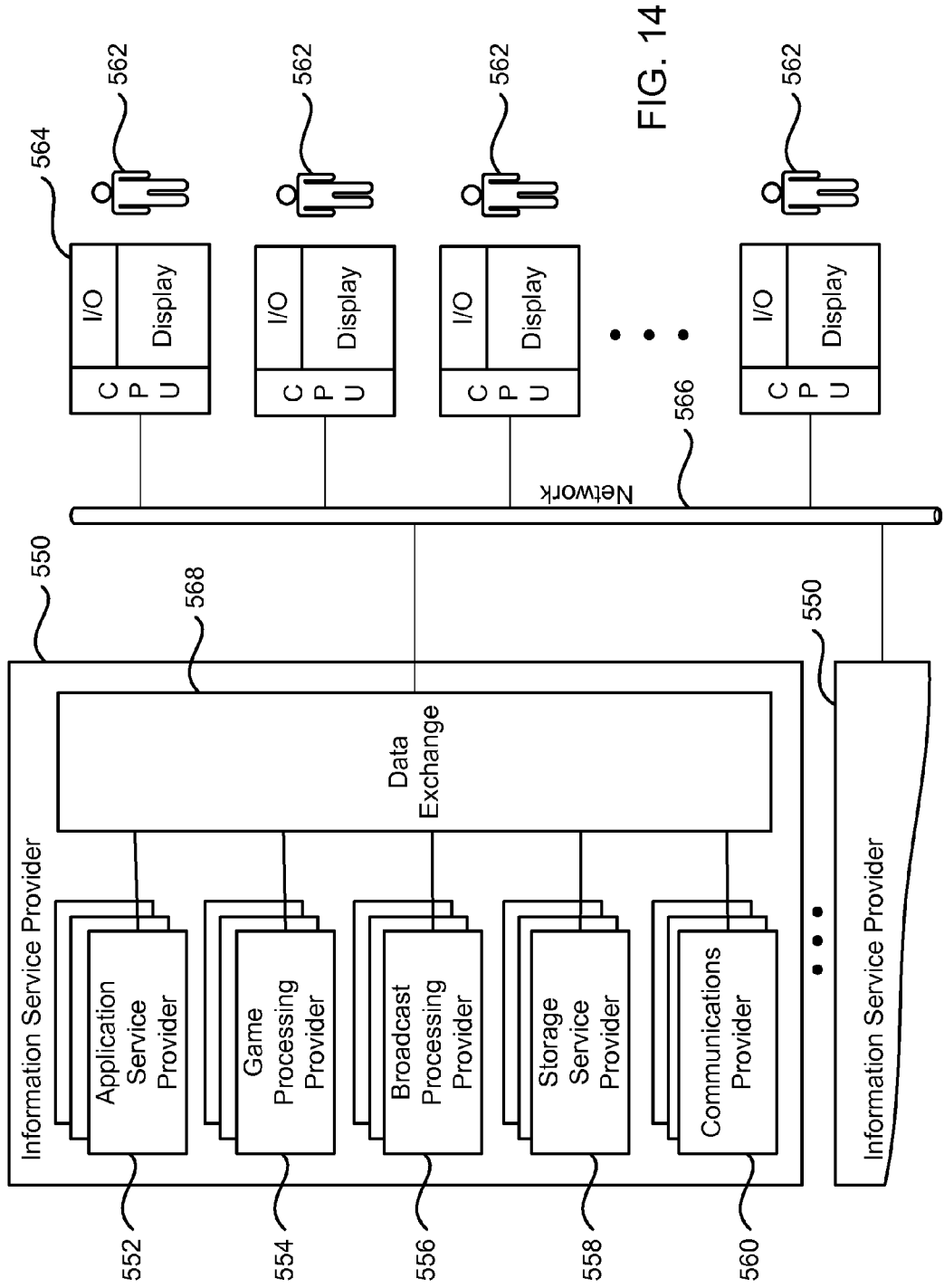
FIG. 14 illustrates an embodiment of an Information Service Provider architecture.

FIG. 14 illustrates an embodiment of an Information Service Provider architecture. Information Service Providers (ISP) 550 delivers a multitude of information services to users 562 geographically dispersed and connected via network 566. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 550 includes Application Service Provider (ASP) 552, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 550 includes a Game Processing Server (GPS) 554 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 556 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 558 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 560 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 568 interconnects the several modules inside ISP 550 and connects these modules to users 562 via network 566. Data Exchange 568 can cover a small area where all the modules of ISP 550 are in close proximity, or can cover a large geographic area when the different modules are geographically dispersed. For example, Data Exchange 568 can include a fast Gigabit Ethernet (or faster) within a cabinet of a data center, or an intercontinental virtual area network (VLAN).

Users 562 access the remote services with client device 564, which includes at least a CPU, a display and I/O. The client device can be a PC, a mobile phone, a netbook, a PDA, etc. In one embodiment, ISP 550 recognizes the type of device used by the client and adjusts the communication method employed. In other cases, client devices use a standard communications method, such as html, to access ISP 550.

Figure 15:
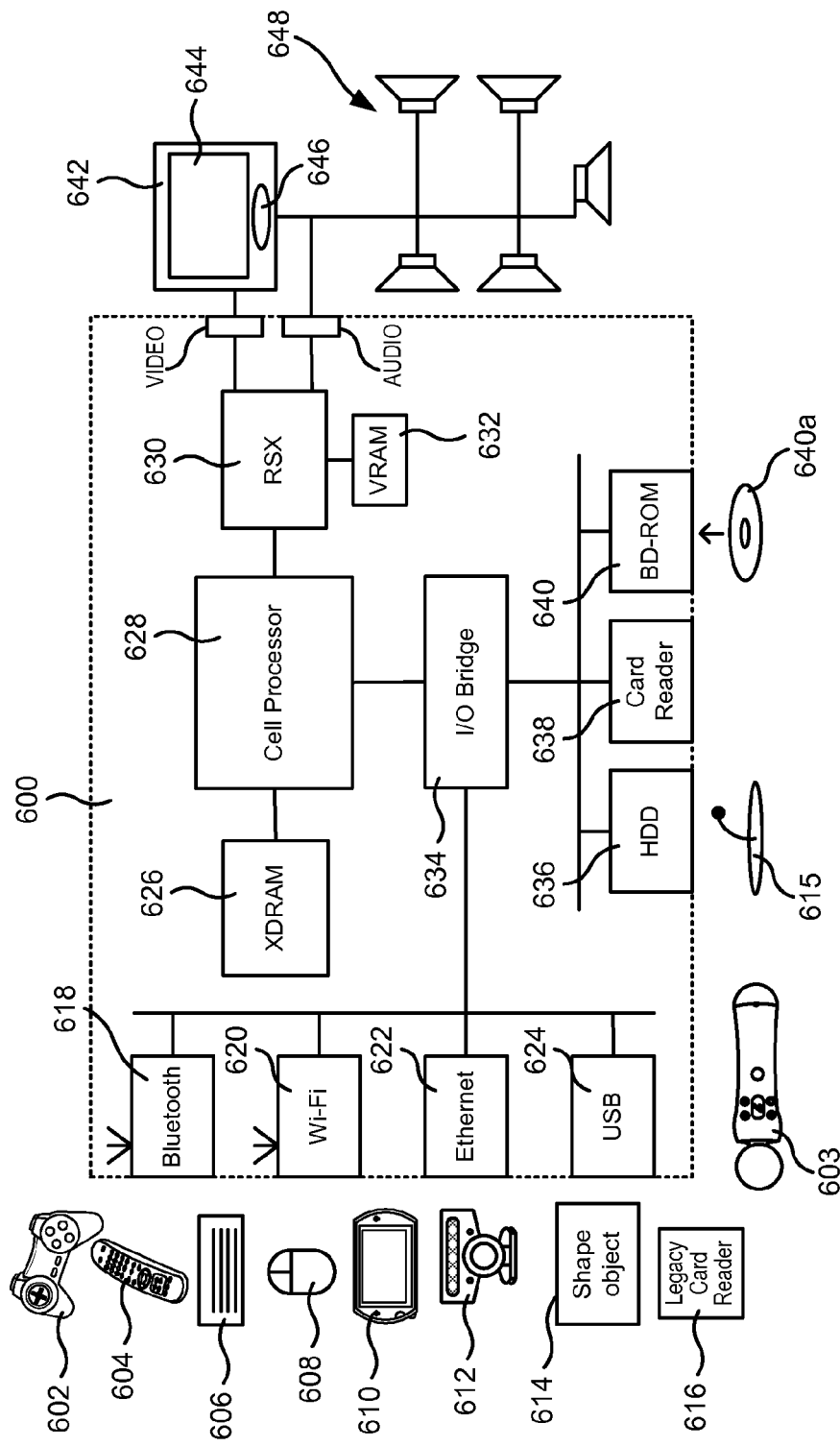
FIG. 15 illustrates hardware and user interfaces that may be used to provide interactivity, in accordance with one embodiment of the present invention.

FIG. 15 illustrates hardware and user interfaces that may be used to implement embodiments of the invention. FIG. 15 schematically illustrates the overall system architecture of the Sony® Playstation 3® entertainment device. A system unit 600 is provided, with various peripheral devices connectable to the system unit 600. The system unit 600 comprises: a Cell processor 628; a Rambus® dynamic random access memory (XDRAM) unit 626; a Reality Synthesizer graphics unit 630 with a dedicated video random access memory (VRAM) unit 632; and an I/O bridge 634. The system unit 600 also comprises a Blu Ray® Disk BD-ROM® optical disk reader 640 for reading from a disk 640a and a removable slot-in hard disk drive (HDD) 636, accessible through the I/O bridge 634. Optionally, the system unit 600 also comprises a memory card reader 638 for reading compact flash memory cards, Memory Stick® memory cards and the like, which is similarly accessible through the I/O bridge 634.

The I/O bridge 634 also connects to six Universal Serial Bus (USB) 2.0 ports 624; a gigabit Ethernet port 622; an IEEE 802.11b/g wireless network (Wi-Fi) port 620; and a Bluetooth® wireless link port 618 capable of supporting of up to seven Bluetooth connections.

In operation, the I/O bridge 634 handles all wireless, USB and Ethernet data, including data from one or more game controllers 602-603. For example, when a user is playing a game, the I/O bridge 634 receives data from the game controller 602-603 via a Bluetooth link and directs it to the Cell processor 628, which updates the current state of the game accordingly.

The wireless, USB and Ethernet ports also provide connectivity for other peripheral devices in addition to game controllers 602-603, such as: a remote control 604; a keyboard 606; a mouse 608; a portable entertainment device 610 such as a Sony PSP® entertainment device; a video camera such as a PlayStation®Eye Camera 612; a shape object 614; and a microphone 615. Such peripheral devices may therefore in principle be connected to the system unit 600 wirelessly; for example, the portable entertainment device 610 may communicate via a Wi-Fi ad-hoc connection, while the shape object 614 may communicate via a Bluetooth link.

The provision of these interfaces means that the Playstation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 616 may be connected to the system unit via a USB port 624, enabling the reading of memory cards of the kind used by the Playstation® or Playstation 2® devices.

The game controllers 602-603 are operable to communicate wirelessly with the system unit 600 via the Bluetooth link, or to be connected to a USB port, thereby also providing power by which to charge the battery of the game controllers 602-603. Game controllers 602-603 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 602 is a controller designed to be used with two hands, and game controller 603 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 604 is also operable to communicate wirelessly with the system unit 600 via a Bluetooth link. The remote control 604 comprises controls suitable for the operation of the Blu Ray™ Disk BD-ROM reader 640 and for the navigation of disk content.

The Blu Ray™ Disk BD-ROM reader 640 is operable to read CD-ROMs compatible with the Playstation and PlayStation 2 devices, in addition to conventional pre-recorded and recordable CDs, and so-called Super Audio CDs. The reader 640 is also operable to read DVD-ROMs compatible with the Playstation 2 and PlayStation 3 devices, in addition to conventional pre-recorded and recordable DVDs. The reader 640 is further operable to read BD-ROMs compatible with the Playstation 3 device, as well as conventional pre-recorded and recordable Blu-Ray Disks.

The system unit 600 is operable to supply audio and video, either generated or decoded by the Playstation 3 device via the Reality Synthesizer graphics unit (RSX) 630, through audio and video connectors to a display and sound output device 642 such as a monitor or television set having a display 644 and one or more loudspeakers 646, or stand-alone speakers 648. In one embodiment, voice and gaze inputs are utilized to play sound toward specific audio speakers according to the POG of the user. The audio connectors 650 may include conventional analogue and digital outputs while the video connectors 652 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 628. The Playstation 3 device's operating system supports Dolby® 5.1 surround sound, Dolby® Theatre Surround (DTS), and the decoding of 7.1 surround sound from Blu-Ray® disks.

In the present embodiment, the video camera 612 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 600. The camera LED indicator is arranged to illuminate in response to appropriate control data from the system unit 600, for example to signify adverse lighting conditions. Embodiments of the video camera 612 may variously connect to the system unit 600 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may, for example, be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 600, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A shape object, comprising:
a line segment having a length that extends between a first end and a second end, the line segment being flexible into a plurality of positions, each of the plurality of positions used to define a shape of the line segment;
an optical fiber integrated along the line segment;
an interface connectable to the optical fiber of the line segment, the interface being at the first end of the line segment, the interface including,
a first circuit for communicating optical signals to the optical fiber, the first circuit being configured to identify the shape and changes in the shape of the line segment over time; and
a second circuit for wirelessly transmitting shape data used to identify the shape of the line segment to a computer that is remote from the line segment, the wireless transmitting of the shape data being one-way to the computer;
wherein the first end of the line segment is configured for placement at a known separation to a tracked object that is separately tracked in three dimensional space, the tracked object not being connected to the shape object, the shape data is independent of data defining a position in three dimensional space of the tracked object.

2. The shape object of claim 1, wherein the line segment is configured for integration into clothing or for attachment to clothing of a user.

3. The shape object of claim 1, wherein the line segment includes a biometric sensor, the biometric sensor defined to obtain a condition of the user at a location along the line segment, the biometric sensor producing sensor data that is communicated to the computer by the second circuit of the interface.

4. The shape object of claim 1, wherein line segment includes a plurality of light emitting devices, the light emitting devices being arranged along the length of the line segment and are configured to illuminate at different intensities based on a position along the length or at specific locations along the length based on the position.

5. The shape object of claim 1, wherein the second circuit for wirelessly transmitting shape data used to identify the shape of the line segment to the computer is a wireless transmitter with an antenna.

6. The shape object of claim 5, wherein the second circuit is a Wi-Fi™ device, a Bluetooth™ device, an infrared (IR) device, or a radio communication device.

7. The shape object of claim 1, the interface includes an inertial sensor, the inertial sensor defined to sense motion data of the interface or the line segment, the motion data being communicated to the computer by the second circuit for wirelessly transmitting shape data used to identify the shape to the computer.

8. The shape object of claim 1, wherein the line segment is located along one or two arms of a user.

9. The shape object of claim 1, wherein the line segment is located along limbs of a user.

10. The shape object of claim 1, wherein the line segment is woven into fibers of a clothing item.

11. The shape object of claim 1, wherein the computer is either local or remotely located, the computer being configured to receive shape data used to identify the shape of the line segment while processing position data of the tracked object, the first end of the line segment being placed at the known separation to the tracked object enable the computer to correlate the changes in the shape of the line segment to a position in three dimensional space.

12. The shape object of claim 11, wherein the computer is configured for execution of computer game instructions, and the changes in shape of the line segment are associated to a user's game character in a rendered scene of a game, the user's game character being an image of the user, an avatar of the user, or an object controlled by the user.

13. The shaped object of claim 11, wherein the tracked object is a motion device having a trackable object at one end.

14. A system for interfacing with a game computer program, comprising:
(a) a computer having a radio transceiver, the computer being connected to an image capture device for capturing an interactive space in front of the image capture device;
(b) a shape object defined by,
a line segment having a length that extends between a first end and a second end, the line segment being flexible into a plurality of positions, each of the plurality of positions used to define a shape of the line segment;
an optical fiber integrated along the line segment;

an interface connectable to the line optical fiber of the line segment, the interface being at the first end of the line segment, the interface, the interface including a first circuit for communicating optical signals to the optical fiber, the first circuit being configured to identify the shape and changes in the shape of the line segment over time, and a second circuit for wirelessly transmitting shape data used to identify the shape of the line segment to the computer that is remote from the line segment; and (c) a tracked object, the tracked object being defined on a controller that is not connected to the shape object, the tracked object having a transceiver for communicating data to and from the computer, the communication of data by the transceiver of the tracked object being independent of the communication of shape data by the first and second circuits of the interface, and the first end of the line segment is configured for placement at a known separation to the tracked object, the computer being configured to correlate the first end of the line segment with a three dimensional position of the tracked object, the three dimensional position being identified by the computer using an image capture device.

15. The system of claim 14, wherein the line segment is configured for integration into clothing or for attachment to clothing of a user.

16. The system of claim 14, wherein the line segment includes a biometric sensor, the biometric sensor defined to obtain a condition of the user at a location along the line segment, the biometric sensor producing sensor data that is communicated to the computer by second circuit of the interface.

17. The system of claim 14, wherein line segment includes a plurality of light emitting devices, the light emitting devices being arranged along the length of the line segment and are configured to illuminate at different intensities based a position along the length or at specific locations along the length based on the position.

18. The system of claim 14, wherein the second circuit for wirelessly transmitting shape data used to identify the shape of the line segment to the computer is a wireless transmitter with an antenna, and the wireless transmitter is one of a Wi-Fi™ device, a Bluetooth™ device, an infrared (IR) device, or a radio communication device.

19. The system of claim 14, the interface includes an inertial sensor, the inertial sensor defined to sense motion data of the interface or the line segment, the motion data being communicated to the computer by the second circuit for wirelessly transmitting shape data used to identify the shape to the computer.

20. The system of claim 14, wherein the line segment is attachable along an arm of the user, along two arms of the user, along limbs of the user, on the head of the user, on a clothing item of the user, or on a strap.

21. A method for detecting a shape of a shape object worn by user, comprising:
  detecting shape data of a line segment that extends along a length between a first end and a second end, the line segment being flexible into a plurality of positions;
  receiving the shape data of the line segment at a computer wirelessly;
  identifying a position data of a tracked object, the position data of the tracked object being identified by the computer using an image capture device, independent of the shape data received by the computer;
  performing a calibration based on the position data to identify a known separation between the tracked object and the first end of the line segment;
  correlating the position data of the tracked object to the first end of the line segment, such that movement of the first end of the line segment is continuously correlated to current position data of the tracked object; and
  rendering a graphical representation of the tracked object and the line segment to a display during interactivity with a computer program executed by a processor of the computer.

22. The method of claim 21, wherein the graphical representation renders movement of an object of the computer program.

23. The method of claim 21, wherein the object is one of a game character, a game object, an avatar of the user, an animated character, or an animated input device.

24. The method of claim 21, further comprising:
  receiving biometric data wirelessly from one or more locations along the line segment, the biometric data including one or more of heart rate data, muscle data, or brain activity data.

25. The method of claim 21, further comprising:
  receiving inertial data wirelessly from one or more locations along the line segment, the inertial data providing a motion profile of at least one position on a user's body.

26. The method of claim 21, further comprising:
  providing light illumination instructions to the line segment to cause one or more light emitting devices, at one more positions along the line segment, to illuminate in intensity, color, or rate.

27. The method of claim 21, wherein the known separation is a relative position between the tracked object and an interface of the line segment.

* * * * *